(12) United States Patent
Sawayanagi et al.

(10) Patent No.: US 12,237,625 B2
(45) Date of Patent: Feb. 25, 2025

(54) ILLUMINATION UNIT

(71) Applicant: YAZAKI CORPORATION, Tokyo (JP)

(72) Inventors: Masahiro Sawayanagi, Makinohara (JP); Takashi Wakasugi, Makinohara (JP); Masahiro Nakamura, Makinohara (JP); Kosuke Yamaguchi, Makinohara (JP); Hiroyuki Suzuki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/674,785

(22) Filed: May 24, 2024

(65) Prior Publication Data

US 2024/0405487 A1  Dec. 5, 2024

(30) Foreign Application Priority Data

May 30, 2023 (JP) ................................. 2023-088538

(51) Int. Cl.
| | | |
|---|---|---|
| H01R 13/717 | (2006.01) | |
| F21S 41/19 | (2018.01) | |
| F21V 1/04 | (2006.01) | |
| F21V 23/06 | (2006.01) | |
| B60L 53/16 | (2019.01) | |
| F21Y 101/00 | (2016.01) | |

(52) U.S. Cl.
CPC ............. *H01R 13/717* (2013.01); *F21V 1/04* (2013.01); *F21V 23/06* (2013.01); *B60L 53/16* (2019.02); *F21S 41/192* (2018.01); *F21Y 2101/00* (2013.01); *H01R 2201/26* (2013.01)

(58) Field of Classification Search
CPC ......... H01R 13/717; F21V 1/04; F21V 23/06; F21S 41/192; F21Y 2101/00; H02J 7/0047; B60L 53/15; Y02T 90/14
See application file for complete search history.

(56) References Cited

FOREIGN PATENT DOCUMENTS

| | | | | |
|---|---|---|---|---|
| JP | 2015216074 A | * | 12/2015 | |
| JP | 2017-61188 A | | 3/2017 | |
| WO | WO-2012157145 A1 | * | 11/2012 | ............. G02B 6/002 |

OTHER PUBLICATIONS

Innovation Q+ (Year: 2024).*

* cited by examiner

*Primary Examiner* — Anabel Ton
(74) *Attorney, Agent, or Firm* — KENEALY VAIDYA LLP

(57) ABSTRACT

An illumination unit includes: a substrate to which a first light-emitting element is mounted; a housing that holds the substrate; a case that is attached to the housing so as to cover the substrate and can output light of the first light-emitting element to the outside; and a light-blocking cover that is attached to the substrate, is provided so as not to cover the first light-emitting element in a direction in which light is output while surrounding the first light-emitting element, and is formed higher from a front face of the substrate than the first light-emitting element.

6 Claims, 19 Drawing Sheets

ILLUMINATION UNIT

CROSS-REFERENCE TO RELATED APPLICATION(S)

The present application claims priority to and incorporates by reference the entire contents of Japanese Patent Application No. 2023-088538 filed in Japan on May 30, 2023.

BACKGROUND OF THE INVENTION

1. Field of the Invention

The present invention relates to an illumination unit.

2. Description of the Related Art

In the related art of an illumination unit, for example, a known illumination device is provided at a vehicle and irradiates a charger with light as described in Japanese Patent Application Laid-open No. 2017-061188. The illumination device is configured by covering a light source unit with a light transmission cover and an illumination cover.

The above-described illumination device can be further improved in terms of difficulty in appropriate output of light emitted from the light source unit. For example, in the above-described illumination device, when the light source unit is provided inside the cover to output light, light may leak from the cover in an unintended direction, and appropriate light output is difficult. Furthermore, the above-described illumination device may not be able to be appropriately manufactured because the cover may come into contact with the light source unit when the cover is attached so as to cover the light source unit at the time of manufacturing.

SUMMARY OF THE INVENTION

In view of the above, an object of the present invention is to provide an illumination unit that can appropriately output light and can be appropriately manufactured.

In order to achieve the above mentioned object, an illumination unit according to one aspect of the present invention includes a substrate to which a light-emitting element is mounted; a housing that holds the substrate; a case that is attached to the housing to cover the substrate, and allows light of the light-emitting element to be output to an outside; and a light-blocking cover that is attached to the substrate, surrounds the light-emitting element and leaves the light-emitting element in a direction in which the light is output uncovered, and is formed higher from an attachment face of the substrate than the light-emitting element.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments according to the present invention will be described in detail with reference to the drawings. Note that the present invention is not limited to the embodiments. Constituent elements in the following embodiments include those that can be easily replaced by a person skilled in the art or those that are substantially the same.

First Embodiment

The present embodiment relates to an illumination unit. In the following description, among a first direction, a second direction, and a third direction intersecting one another, the first direction is referred to as a "connection direction X", the second direction is referred to as a "width direction Y", and the third direction is referred to as a "height direction Z". Here, the connection direction X, the width direction Y, and the height direction Z are orthogonal to one another. The connection direction X corresponds to a direction in which the housing and the case are connected to each other, and an insertion direction of the illumination unit into a vehicle body. The width direction Y corresponds to the width direction of the illumination unit. The height direction Z corresponds to the height direction of the illumination unit. Each direction used in the following description represents a direction in a state in which each unit or portion is mounted on a vehicle unless otherwise specified. The term "orthogonal" as used herein includes substantially orthogonal.

Figure 1:
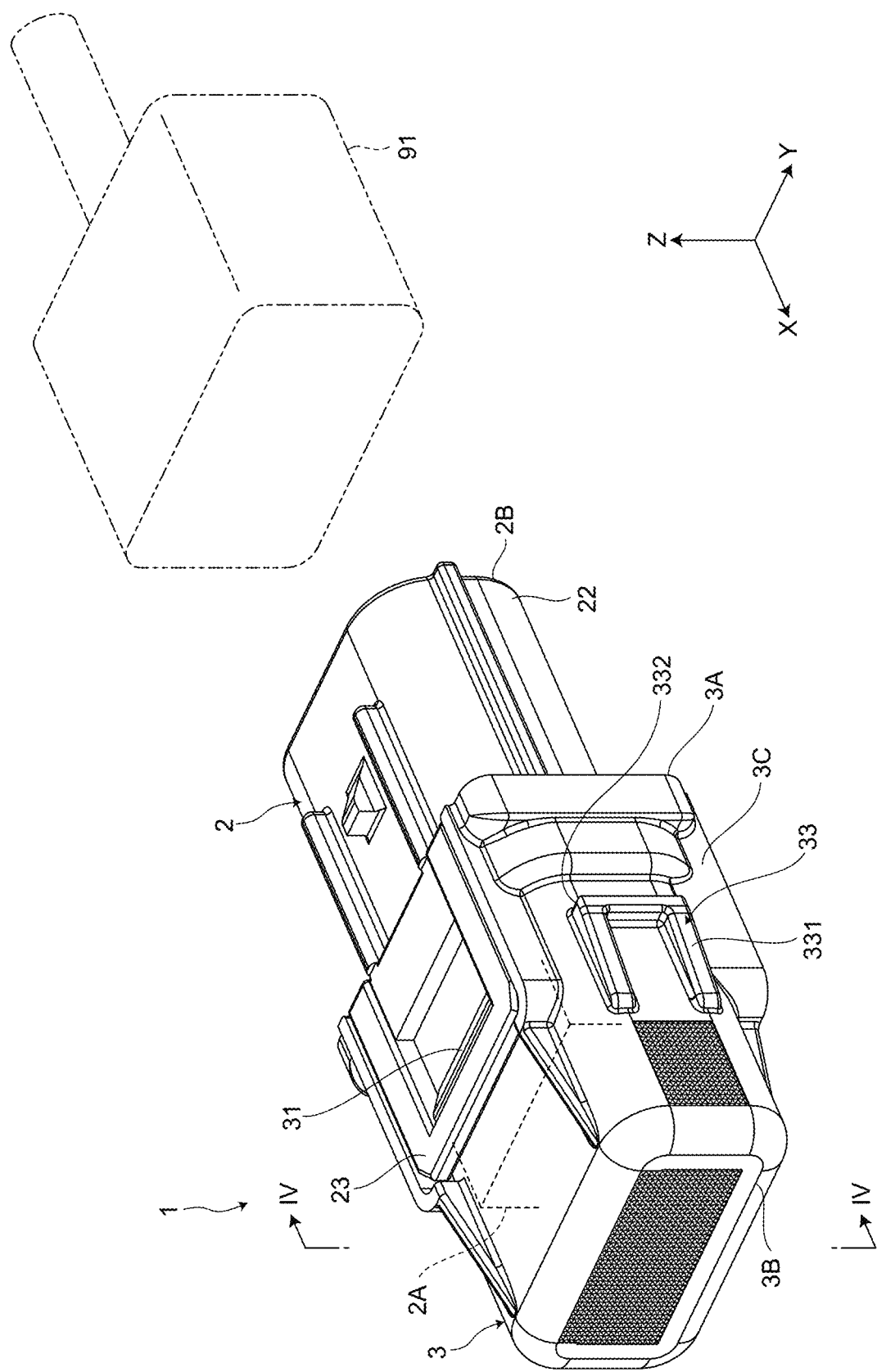
FIG. 1 is a perspective view of an illumination unit according to a first embodiment.
Figure 2:
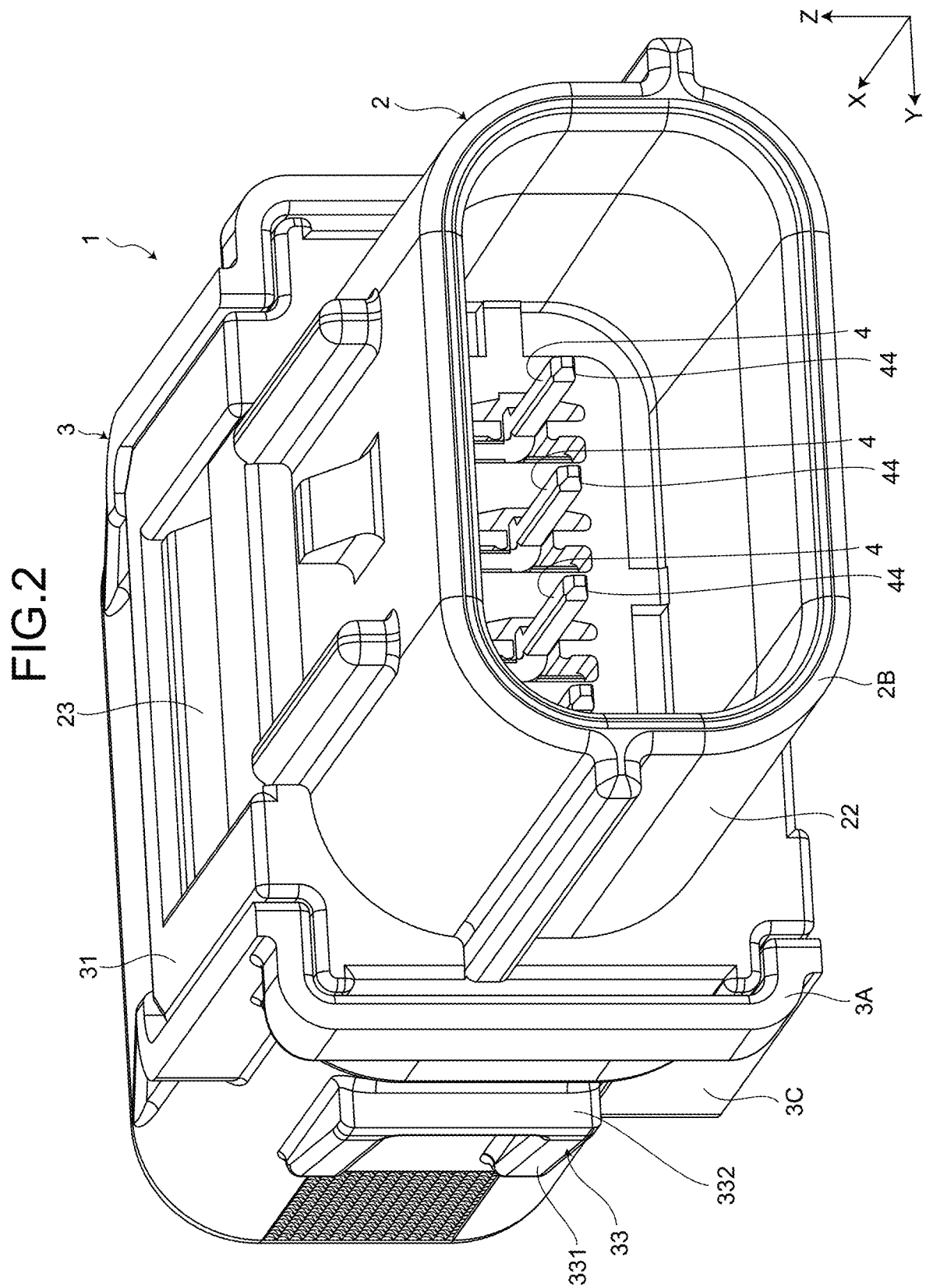
FIG. 2 is a perspective view of the illumination unit according to the first embodiment.
Figure 3:
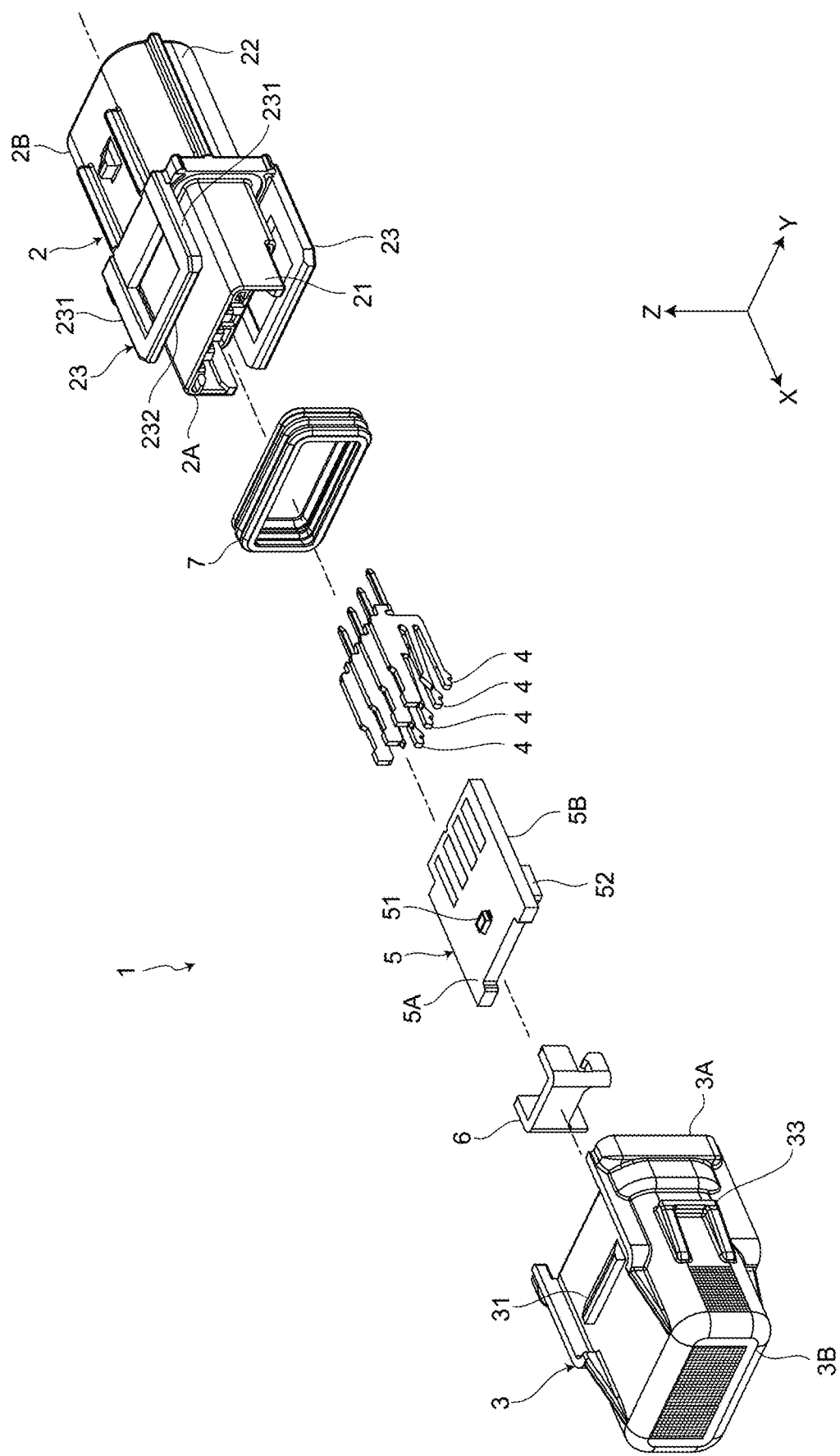
FIG. 3 is an exploded perspective view of the illumination unit according to the first embodiment.

As illustrated in FIGS. 1 to 3, an illumination unit 1 according to a first embodiment is mounted on a vehicle and is used as a unit that irradiates a portion of a vehicle, such as a charging port or a license plate (automobile registration number plate or vehicle number plate), with light. The illumination unit 1 includes a housing 2, a case 3, a bus bar 4, and a substrate 5.

The housing 2 is a member that holds the bus bar 4 and the substrate 5. For example, the housing 2 is formed in a block shape, formed to be larger in the width direction Y than in the height direction Z, and formed to be longer in the connection direction X than in the width direction Y and the height direction Z. In the housing 2, the case 3 is attached to one end 2A in the connection direction X, and a connector 91 is attached to the other end 2B in the connection direction X. The connector 91 is a vehicle-side connector, supplies power to the illumination unit 1, and inputs an illumination control signal. The connector 91 is fitted and attached to the end 2B of the housing 2 and is electrically connected to the illumination unit 1.

The housing 2 includes a front end hood 21 formed on the end 2A side and a rear end hood 22 formed on the end 2B side. The front end hood 21 is a cylindrical part or a partially cut-out semi-cylindrical part extending toward the end 2A in the connection direction X. For example, the front end hood 21 has a rectangular or substantially rectangular cross section intersecting the connection direction X. The rear end hood 22 is a cylindrical part extending toward the end 2B in the connection direction X. For example, the rear end hood 22 has a rectangular, substantially rectangular, or oval-shaped cross section intersecting the connection direction X. The front end hood 21 is a part to be fitted to the case 3 upon attachment of the case 3. The rear end hood 22 is a part to be fitted to the connector 91 upon attachment of the connector 91.

The substrate 5 is a printed wiring board on which an electronic component is mounted. For example, a double-sided substrate having wiring patterns on both front and back faces is used. The substrate 5 having a rectangular or substantially rectangular plate shape is used. The substrate 5 is provided in a direction intersecting the height direction Z. The substrate 5 is, for example, held and attached to the front end hood 21 of the housing 2. In the substrate 5, a first light-emitting element 51 is mounted on a front face 5A, and a second light-emitting element 52 is mounted on a back face 5B. The first light-emitting element 51 and the second light-emitting element 52 emit light on the basis of different control signals. For example, the first light-emitting element 51 and the second light-emitting element 52 that emit light of different colors are used. For example, a light-emitting diode (LED) is used as the first light-emitting element 51 and the second light-emitting element 52. Provision of a plurality of the first light-emitting elements 51 and a plurality of the second light-emitting elements 52 on the substrate 5 allows the illumination unit 1 to output not only illumination light but also light indicating vehicle information such as an amount of charge. Note that, in the substrate 5 in each drawing, illustration of electronic components other than the first light-emitting element 51 and the second light-emitting element 52 is omitted.

A light-blocking cover 6 is attached to the substrate 5. The light-blocking cover 6 is a member that blocks a part of light emitted from the first light-emitting element 51 and the second light-emitting element 52, and regulates or adjusts an output direction of light. For example, the light-blocking cover 6 is provided so as not to cover the first light-emitting element 51 and the second light-emitting element 52 in a direction in which light is output while surrounding the first light-emitting element 51 and the second light-emitting element 52. For example, the light-blocking cover 6 is provided so as to surround the front side and both lateral sides of the first light-emitting element 51 and not to cover the upper side of the first light-emitting element 51. The light-blocking cover 6 is provided so as to surround one lateral side of the second light-emitting element 52 and not to cover the other lateral side of the second light-emitting element 52. With this configuration, light emitted from the first light-emitting element 51 is output in the height direction z, and light emitted from the second light-emitting element 52 is output in the width direction Y. Note that the surrounding of the first light-emitting element 51 and the second light-emitting element 52 described here is not necessarily limited to surrounding of the entire periphery of the first light-emitting element 51 and the second light-emitting element 52 and may include surrounding of a part of the periphery of the first light-emitting element 51 and the second light-emitting element 52.

The light-blocking cover 6 is formed higher in the height direction Z than the first light-emitting element 51 and the second light-emitting element 52. For example, the light-blocking cover 6 is attached to the front end portion of the substrate 5 and is provided so as to protrude in the height direction Z from the front face 5A side and the back face 5B side.

Figure 4:
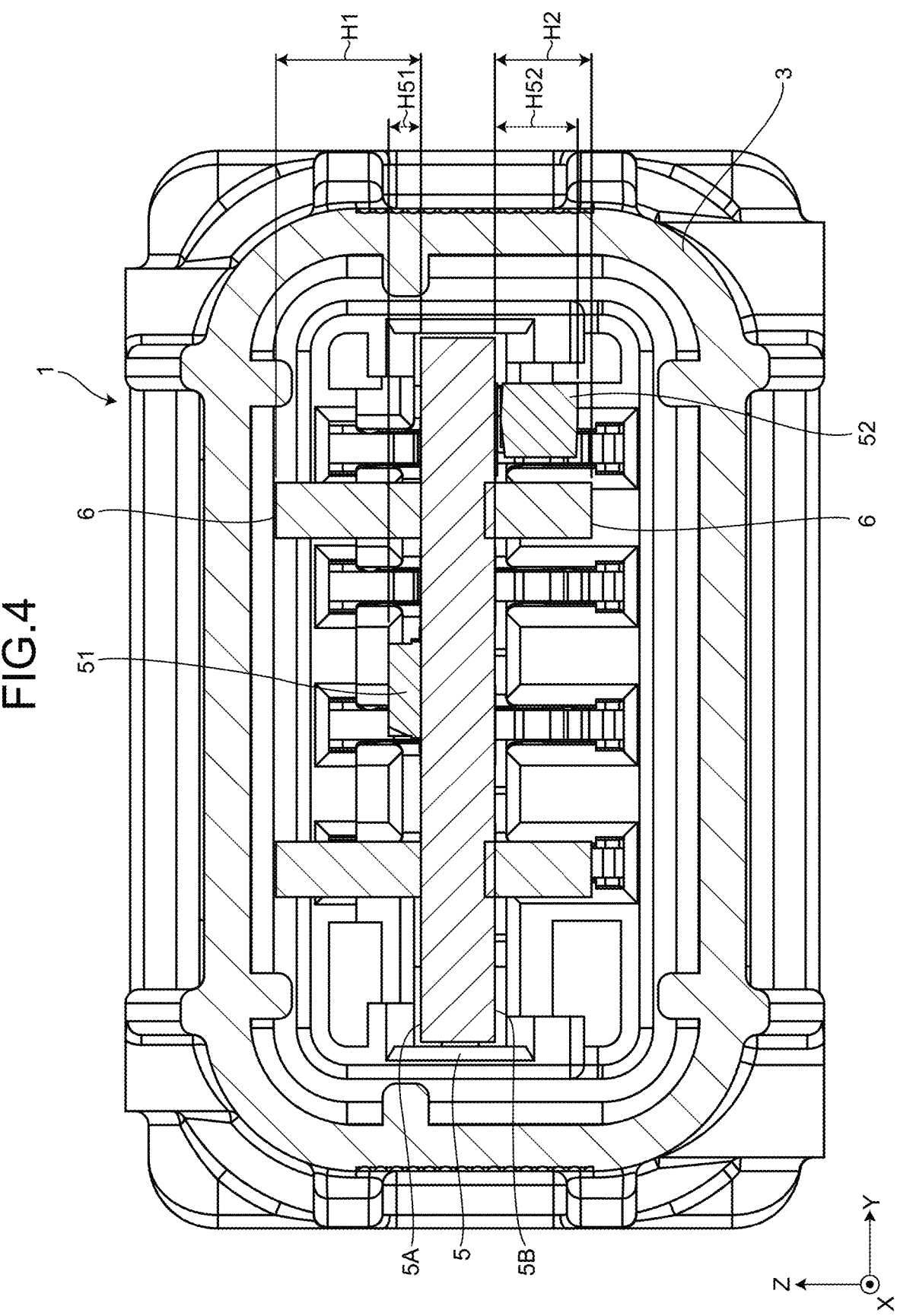
FIG. 4 is an explanatory view of a light-blocking cover of the illumination unit according to the first embodiment.

As illustrated in FIG. 4, a height H1 of the light-blocking cover 6 from the front face 5A of the substrate 5 is higher than a height H51 of the first light-emitting element 51. The height H2 of the light-blocking cover 6 from the back face 5B of the substrate 5 is higher than the height H52 of the second light-emitting element 52. The height described here means a protrusion length from the front face 5A and the back face 5B. The front face 5A and the back face 5B function as attachment faces of the substrate 5 for mounting the first light-emitting element 51 and the second light-emitting element 52. Provision of the light-blocking cover 6 in this manner refrains the case 3 from accidentally coming into contact with the first light-emitting element 51 or the second light-emitting element 52 upon attachment of the case 3 to the housing 2. Therefore, the light-blocking cover 6 functions as a protective member that protects the first light-emitting element 51 and the second light-emitting element 52.

The light-blocking cover 6 has, for example, a white surface. The light-blocking cover 6 is formed of a white resin or the like. Whole body of the light-blocking cover 6 may be white, or only the surface thereof may be white. By making the surface of the light-blocking cover 6 white, the light reflectance of the light-blocking cover 6 can be increased. Therefore, as compared with the light-blocking cover 6 being not white, such as the black light-blocking cover 6, the amount of light emitted from the illumination unit 1 can be increased, and a portion of a vehicle can be brightly illuminated.

In FIG. 3, the bus bar 4 is a member for connecting the connector 91 and the substrate 5. The bus bar 4 is in contact with the substrate 5 by sandwiching the substrate 5 and is electrically connected to the connector 91. For example, a conductive metal plate is used as the bus bar 4. Four bus bars 4 are provided in the illumination unit 1, arranged in the width direction Y, and held by the housing 2. Three bus bars 4 or five or more bus bars 4 may be provided depending on the number of installed light-emitting elements mounted on the substrate 5.

Figure 5:
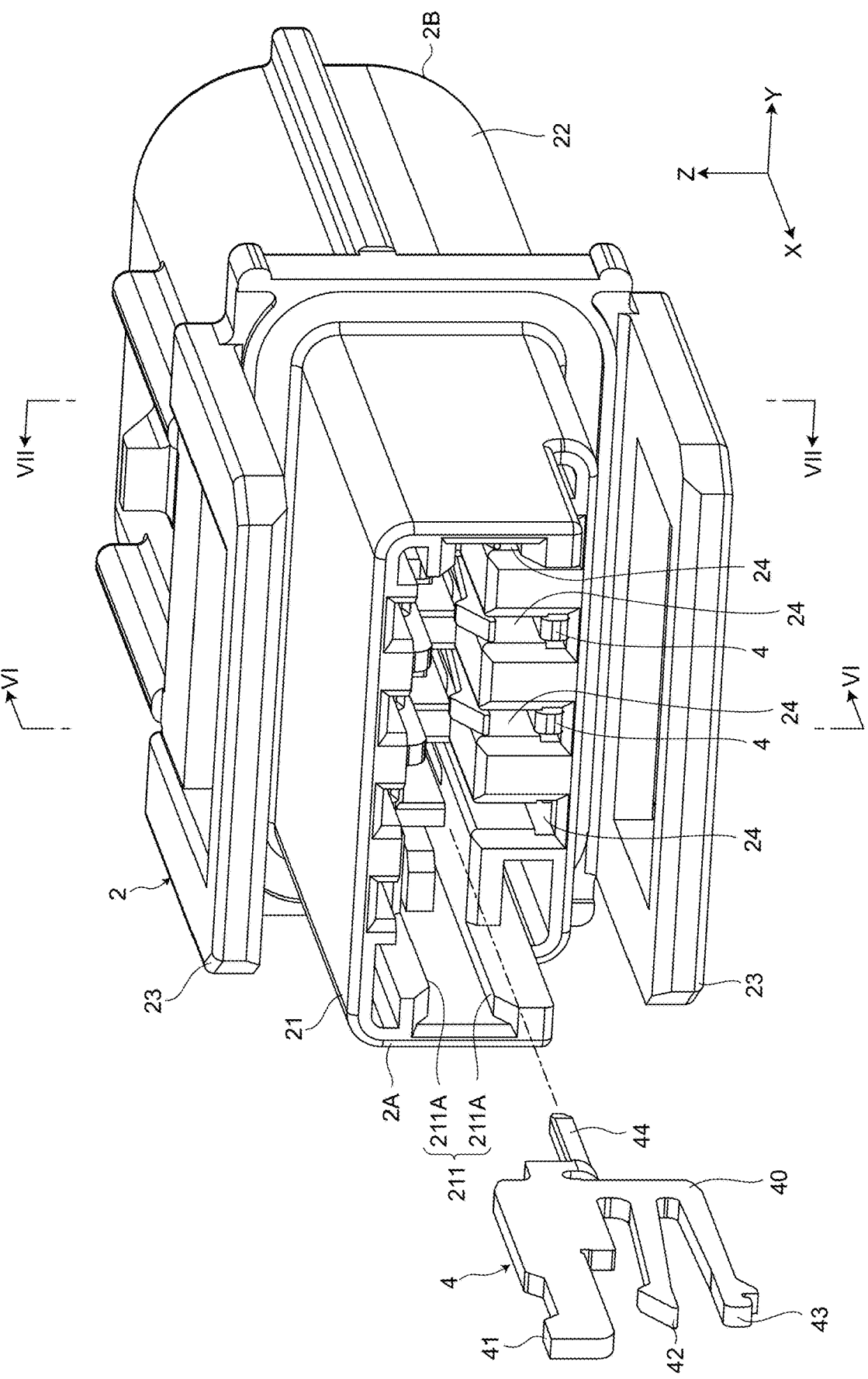
FIG. 5 is an explanatory view of a housing and a bus bar of the illumination unit according to the first embodiment.
Figure 6:
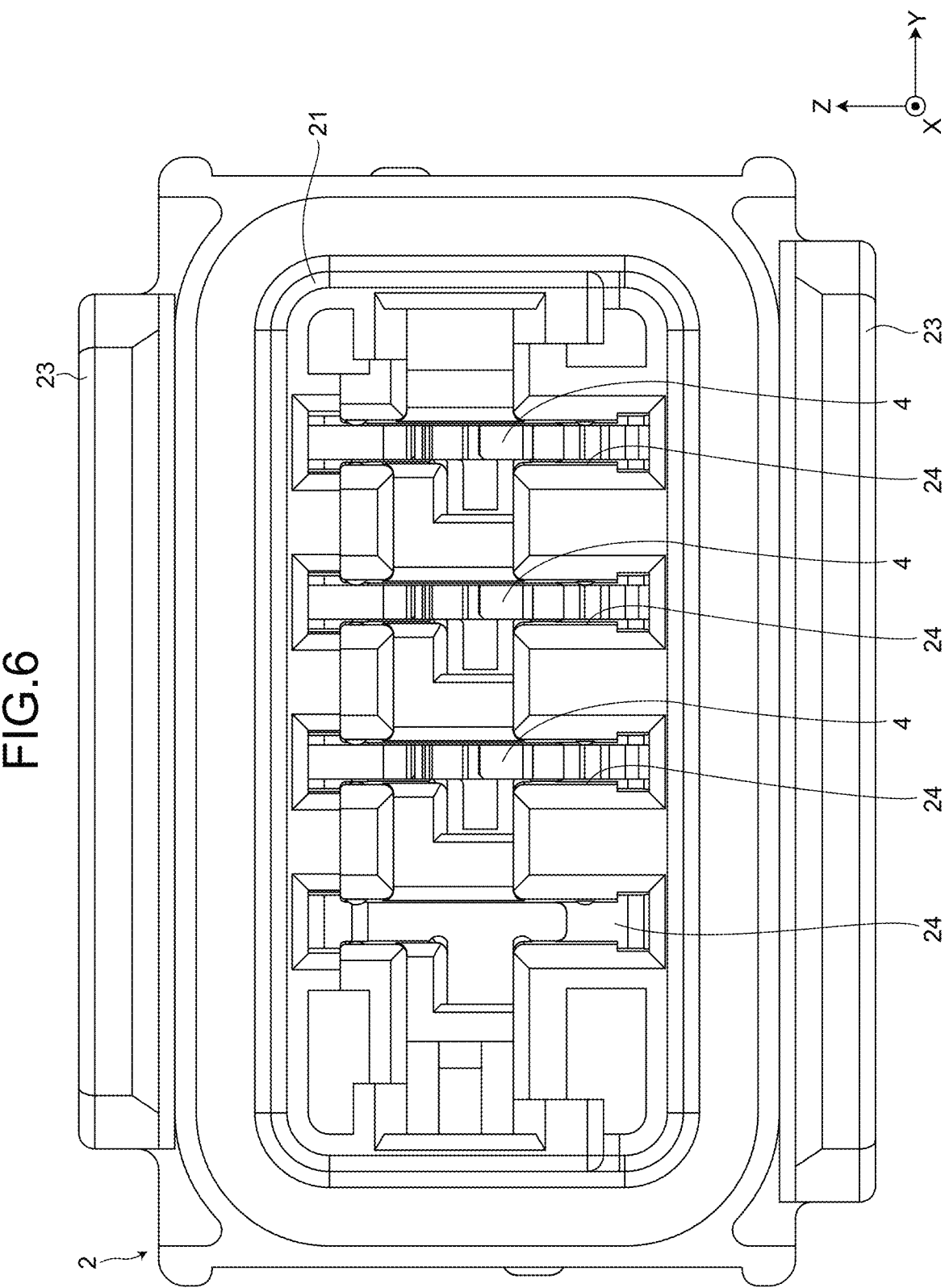
FIG. 6 is an explanatory view of the housing and the bus bar of the illumination unit according to the first embodiment.

As illustrated in FIGS. 5 and 6, the bus bar 4 is installed by being inserted into a bus bar receiving slot 24 of the housing 2 from the one end 2A side of the housing 2. FIGS. 5 and 6 illustrate only the housing 2 and the bus bar 4 of the illumination unit 1 and illustrate a state in which one bus bar 4 of the four bus bars 4 is detached from the housing 2. FIG. 6 is a view of the housing 2 as viewed from the front side of line VI-VI in FIG. 5. The bus bar receiving slot 24 is formed inside the front end hood 21, passes through the housing 2 in the connection direction X, and communicates with a space inside the rear end hood 22. The bus bar receiving slot 24 is formed so that the bus bar 4 is fitted thereto in the width direction Y and the height direction Z. The bus bar receiving slot 24 receives and holds the bus bar 4 so that the bus bar 4 does not move in the width direction Y and the height direction Z. For example, a part of the bus bar receiving slot 24 is formed to have the same dimensions as the width and height of the bus bar 4. Here, the same dimension includes substantially the same dimension. The bus bar receiving slot 24 receives the bus bar 4 so that the direction of the plate-shaped bus bar 4 intersects the width direction Y.

In FIG. 5, the bus bar 4 includes a main body 40, a first contact piece 41, a second contact piece 42, a locking piece 43, and a connection portion 44. The main body 40 is a plate-shaped part extending in the height direction Z and connects the first contact piece 41, the second contact piece 42, the locking piece 43, and the connection portion 44. The first contact piece 41, the second contact piece 42, and the locking piece 43 each extend from the main body 40 toward the front end. That is, the first contact piece 41, the second contact piece 42, and the locking piece 43 each extend toward the one end 2A of the housing 2 with the bus bar 4 being held by the housing 2. The connection portion 44 extends toward the rear end from the main body 40. That is, the connection portion 44 extends toward the other end 2B of the housing 2 with the bus bar 4 being held by the housing 2.

Figure 7:
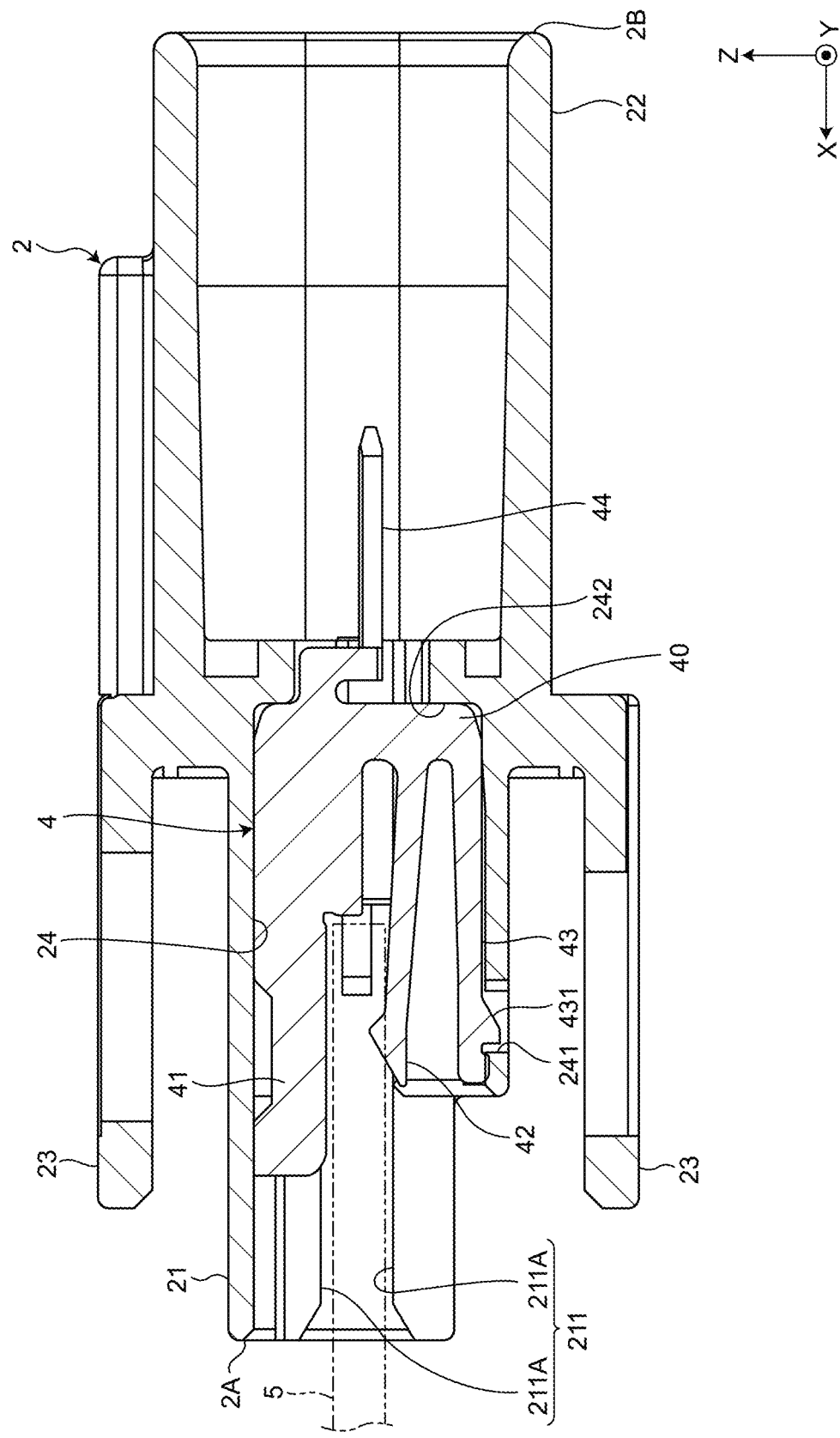
FIG. 7 is a sectional view of the housing and the bus bar taken along line VI-VI in FIG. 5.

As illustrated in FIG. 7, the first contact piece 41 and the second contact piece 42 are a pair of contact pieces electrically connected to the substrate 5 by sandwiching the substrate 5. The first contact piece 41 and the second contact piece 42 each have a rod shape and each extend in the connection direction X. The first contact piece 41 and the second contact piece 42 are provided adjacent to each other in the height direction z and are electrically connected to the substrate 5 to be inserted therebetween. For example, the second contact piece 42 is formed to be thinner in the height direction z than the first contact piece 41. When the substrate 5 enters between the first contact piece 41 and the second contact piece 42, the second contact piece 42 is bent and elastically deformed in a direction away from the substrate 5. Therefore, the second contact piece 42 presses the substrate 5 by the restoring force of the elastic deformation and is brought into pressure contact with the substrate 5.

The locking piece 43 is a part that locks the bus bar 4 to the housing 2. The locking piece 43 has a rod shape and extends in the connection direction X. The locking piece 43 forms a lance 431. The lance 431 is a claw that locks the bus bar 4 inserted into the bus bar receiving slot 24 and restrains the bus bar 4 from slipping out. For example, the lance 431 is formed to protrude from the surface of the locking piece 43 and to be tapered in an insertion direction of the bus bar 4 (in the right direction in FIG. 7). The lance 431 allows the bus bar 4 to enter the bus bar receiving slot 24 and restricts backward movement. That is, during the bus bar 4 being received, the lance 431 enters a recess 241 formed at the bus bar receiving slot 24 and restrains the bus bar 4 from slipping out of the bus bar receiving slot 24. The recess 241 is a depression formed at the inner face of the bus bar receiving slot 24.

The connection portion 44 is a part that electrically connects the bus bar 4 and the connector 91. The connection portion 44 has a rod shape and extends in the connection direction X. When the bus bar receiving slot 24 receives the bus bar 4, the connection portion 44 is provided to protrude into the internal space of the rear end hood 22. Therefore, the connection portion 44 is electrically connected to the connector 91 when the connector 91 is attached to the end 2B of the housing 2.

The substrate 5 is supported by, for example, a guide 211 formed at the front end hood 21 and is held by the housing 2. The guide 211 includes two supports 211A and supports the substrate 5 by sandwiching the substrate 5 with the supports 211A. For example, the supports 211A are provided inside the front end hood 21 and are provided to be separated from each other in the height direction Z with the arrangement position of the substrate 5 interposed therebetween. The supports 211A are each provided to extend in the connection direction X and guide the substrate 5 in the connection direction X. Two guides 211 are provided to be separated from each other in the width direction Y at the front end hood 21 and support both end positions of the substrate 5 and guide the substrate 5. When the substrate 5 is inserted into the front end hood 21, the substrate 5 is guided by the guides 211 and moves in the connection direction X. Then, the substrate 5 enters between the first contact piece 41 and the second contact piece 42 of the bus bar 4 and is electrically connected to the bus bar 4.

Figure 8:
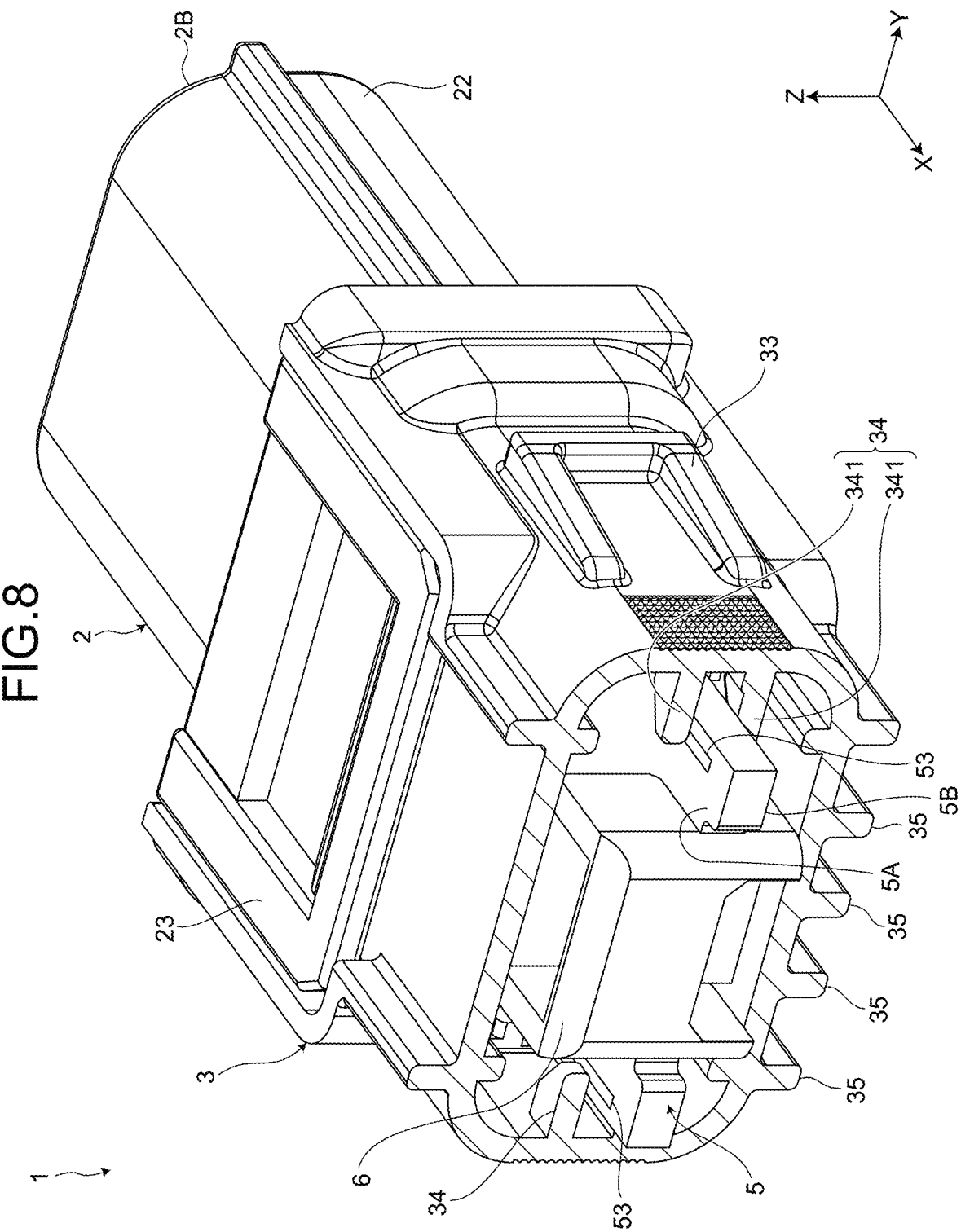
FIG. 8 is an explanatory view of a substrate of the illumination unit according to the first embodiment.

As illustrated in FIG. 8, the substrate 5 includes a heat dissipation wiring pattern 53 at a position where the substrate 5 comes into contact with the case 3. FIG. 8 is an explanatory view of the substrate 5 of the illumination unit 1. For convenience of description, FIG. 8 illustrates the substrate 5 in a state in which the front end portion of the case 3 is cut away. The heat dissipation wiring pattern 53 is a copper foil portion of the substrate 5 and is a wiring pattern for dissipating heat generated from the first light-emitting element 51 or the second light-emitting element 52. The heat dissipation wiring pattern 53 is formed at a position where the substrate 5 comes into contact with the case 3. For example, the heat dissipation wiring pattern 53 is formed extending in the connection direction X at positions of both ends of the substrate 5 in the width direction Y. In FIG. 8, the heat dissipation wiring pattern 53 is formed on the front face 5A of the substrate 5 but is also formed on the back face 5B of the substrate 5.

The substrate 5 is supported by a guide 34 formed at the case 3. The guide 34 includes two supports 341 and supports the substrate 5 by sandwiching the substrate 5 with the supports 341 in the height direction Z. The support 341 is in contact with the heat dissipation wiring pattern 53 of the substrate 5. Therefore, the heat of the heat dissipation wiring pattern 53 is easily conducted to the case 3 through the guide 34. A fin 35 may be formed on the outer surface of the case 3. The fin 35 is a protrusion formed on the outer surface of the case 3 and functions as heat dissipation fins by increasing the surface area of the case 3, thereby enhancing the heat dissipation effect of the case 3.

In FIGS. 1 to 3, the case 3 is attached to the housing 2 so as to cover the substrate 5 and can output light of the first light-emitting element 51 and the second light-emitting element 52 to the outside of the illumination unit 1. The case 3 is, for example, a cylinder having one end being closed and the other end being open. The case 3 is attached to the front end hood 21 of the housing 2. That is, the case 3 is attached to the housing 2 so that an open end 3A covers the outside of the front end hood 21. At this time, a packing 7 is provided between the front end hood 21 and the case 3. The packing 7 is a water flow stop member that stops water from flowing through a space between the housing 2 and the case 3. The packing 7 is formed by a ring-shaped elastic member. The case 3 is attached so as to cover the substrate 5, thereby protecting the substrate 5, the first light-emitting element 51, and the second light-emitting element 52.

The case 3 is made of a light-transmissive member and can output light emitted from the first light-emitting element 51 and the second light-emitting element 52 to the outside of the illumination unit 1. For example, the case 3 is formed of a transparent or semitransparent resin and outputs light emitted from the first light-emitting element 51 and the second light-emitting element 52 to the outside of the illumination unit 1. In this case, light is output from the case 3 in a desired direction by attaching the light-blocking cover 6 to the substrate 5. For example, the installation position and shape of the light-blocking cover 6 are set such that the light-blocking cover 6 does not cover the first light-emitting element 51 and the second light-emitting element 52 in the direction in which light is output. For example, the entire case 3 is made of a light-transmissive member. Note that a part of the case 3 may include a light-blocking member, but the case 3 is different from a case, the majority of which is a light-blocking region and a part of which includes an output window as a light-transmitting region. Note that two or more light-blocking covers 6 may be installed. In FIG. 3, the light-blocking cover 6 covers the front side and lateral sides of the first light-emitting element 51, and light emitted from the first light-emitting element 51 is output upward from the case 3. In this way, even when the case 3 is made of a light-transmissive member, light can be output from the case 3 in a desired direction.

The case 3 is attached to the housing 2 and is locked so as not to be detached from the housing 2. For example, a locking claw 31 is formed at the case 3, and the case 3 can be engaged with a locking arm 23 of the housing 2. The locking claw 31 is a claw member protruding from the surface of the case 3 and engages with the locking arm 23 extending from the housing 2 in the connection direction X. The locking claw 31 and the locking arm 23 function as a locking mechanism for locking the housing 2 and the case 3. Two locking claws 31 and two locking arms 23 are provided, for example, in a separate manner in the height direction z on the upper face side and the lower face side. The locking arm 23 includes two arm portions 231 extending in the connection direction X at a position outside the front end hood 21 and a locking portion 232 spanning between front ends of the two arm portions 231.

Figure 9:
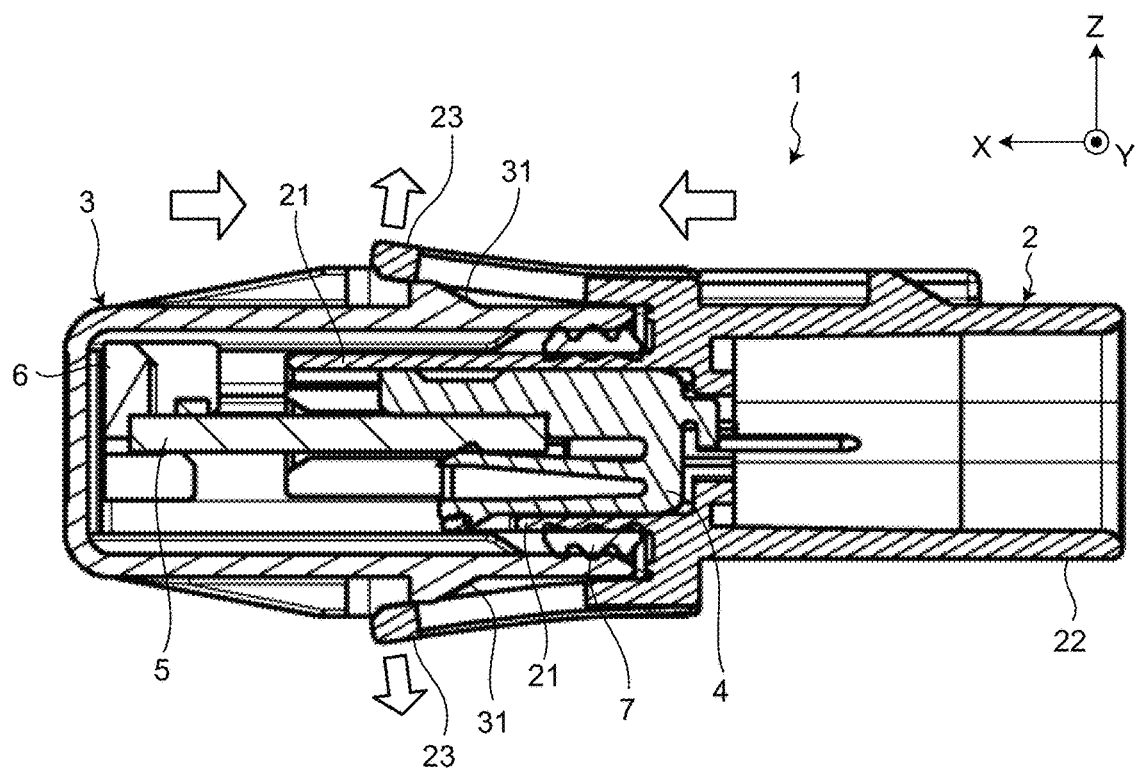
FIG. 9 is an explanatory view of attachment of the housing and a case of the illumination unit according to the first embodiment.
Figure 10:
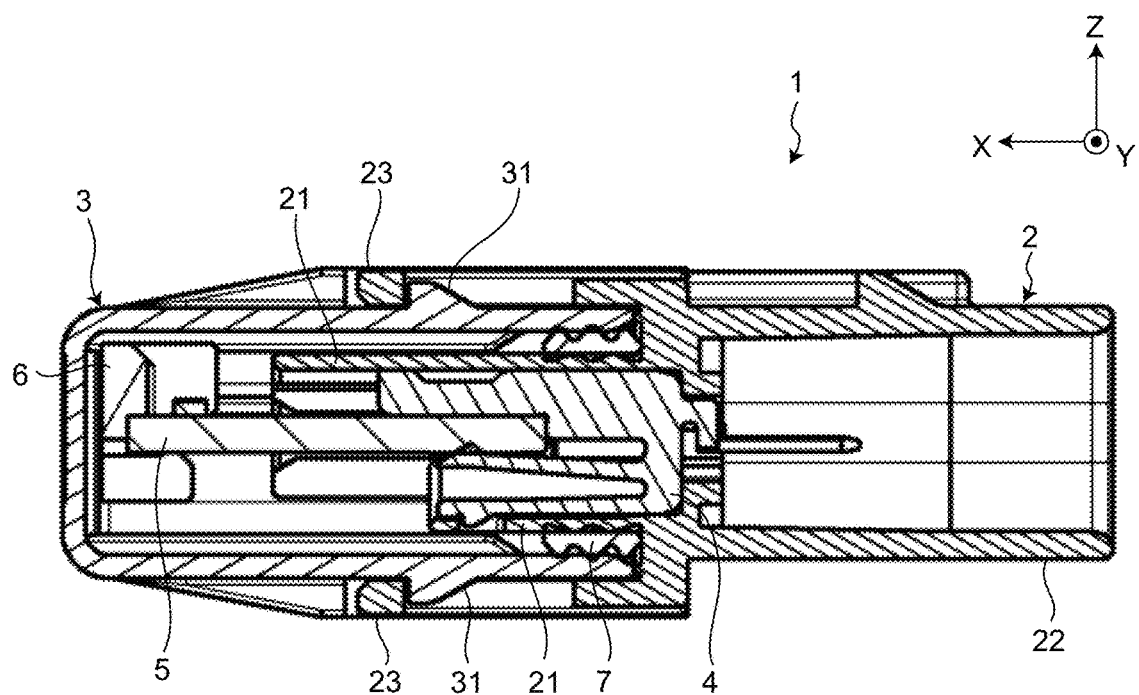
FIG. 10 is an explanatory view of attachment of the housing and the case of the illumination unit according to the first embodiment.

FIGS. 9 and 10 are explanatory views of attachment of the housing 2 and the case 3. FIG. 9 illustrates a state in which the locking claw 31 and the locking arm 23 are engaged halfway and the housing 2 and the case 3 are not properly fitted to each other. FIG. 10 illustrates a state in which the locking claw 31 and the locking arm 23 are fully engaged and the housing 2 and the case 3 are properly fitted to each other. As illustrated in FIG. 9, in attachment of the housing 2 and the case 3, the case 3 and the housing 2 are brought close to each other, and the case 3 comes into contact with the housing 2 so as to cover the substrate 5. Then, the open end 3A of the case 3 passes through the outside of the front end hood 21, and the locking arm 23 of the housing 2 is bent outward and runs on the locking claw 31 of the case 3. Then, as illustrated in FIG. 10, when the case 3 and the housing 2 are further brought close to each other, the locking arm 23 gets over the locking claw 31 and is locked to the locking claw 31. As a result, the housing 2 and the case 3 are attached to each other so as not to be easily detached by the engagement between the locking arm 23 and the locking claw 31.

As illustrated in FIGS. 1 to 3, the case 3 includes a locking portion 33. The locking portion 33 is a part for locking the illumination unit 1 to a vehicle body 92 of a vehicle. Two locking portions 33 are provided, for example, in a separated manner in the width direction Y. Two locking portions 33 are each formed to protrude from a side face 3C. The locking portion 33 has a lance shape and has an inclined face 331 and a locking face 332. The inclined face 331 is formed obliquely with respect to the side face 3C in such a manner that the locking portion 33 has a tapered shape toward a front end 3B of the case 3. The locking face 332 is a face extending from the inclined face 331 toward the side face 3C and intersecting the connection direction X.

Figure 11:
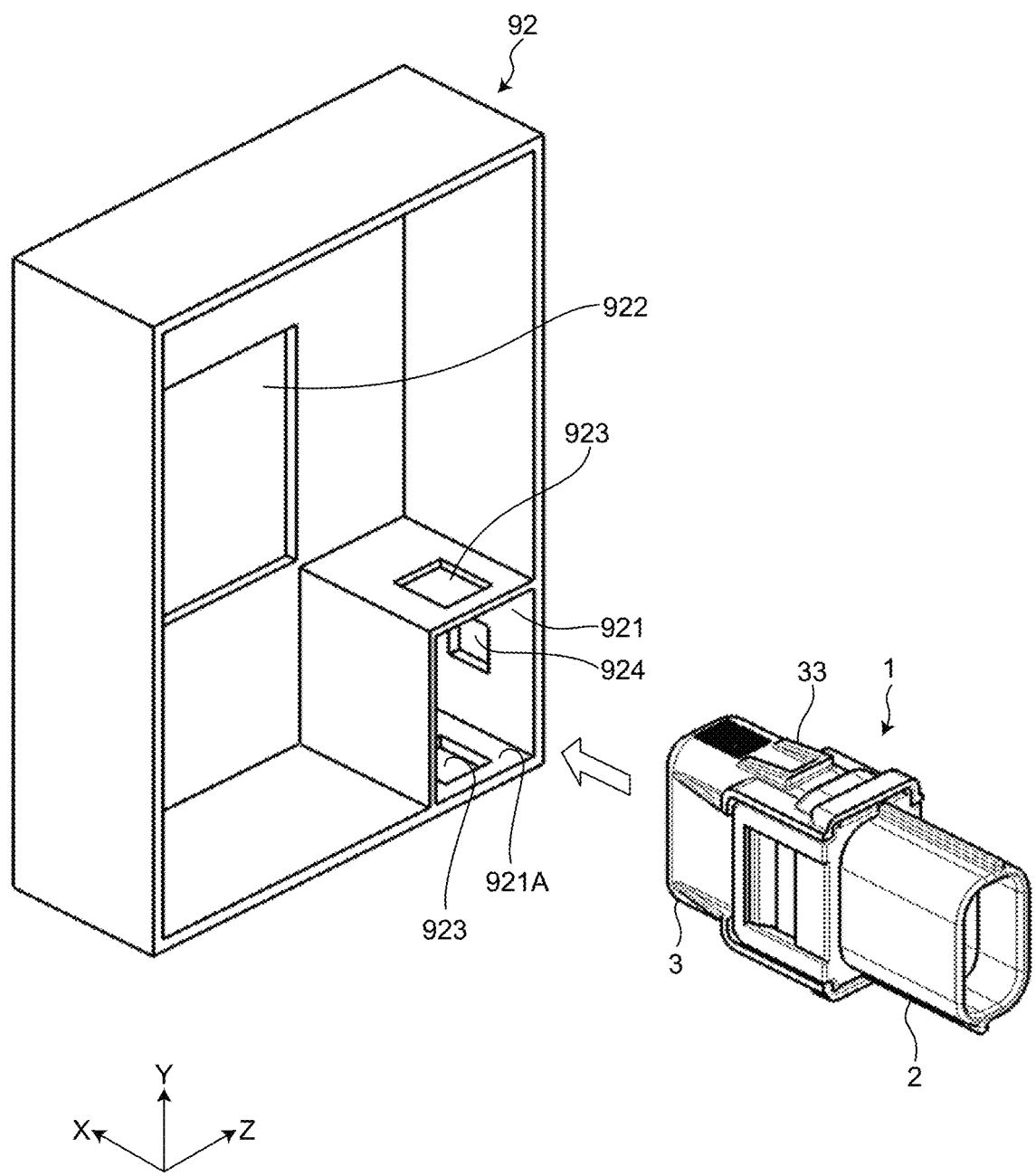
FIG. 11 is an explanatory view of installation of the illumination unit according to the first embodiment to a vehicle.

As illustrated in FIG. 11, the illumination unit 1 is used by being installed in the vehicle body 92. The vehicle body 92 is, for example, a part forming a charging port 922 of a vehicle and is assembled to the vehicle. A receiving compartment 921 that can receive the illumination unit 1 is formed at the vehicle body 92. The receiving compartment 921 is an installation portion for installing the illumination unit 1. The receiving compartment 921 is formed on the back face side of the vehicle body 92 and is formed in a size with which the illumination unit 1 can be inserted into the receiving compartment 921. A locked portion 923 is formed on an inner face 921A of the receiving compartment 921. The locked portion 923 is a part to be engaged with the locking portion 33 of the illumination unit 1 and is formed as, for example, a hole or a recess formed by recessing the inner face 921A. The locked portion 923 is formed to be larger than the locking portion 33 and is locked so that the illumination unit 1 is not slipped out by inserting the locking portion 33. The locked portion 923 may be formed in a shape like a lock arm engageable with the locking portion 33.

Figure 12:
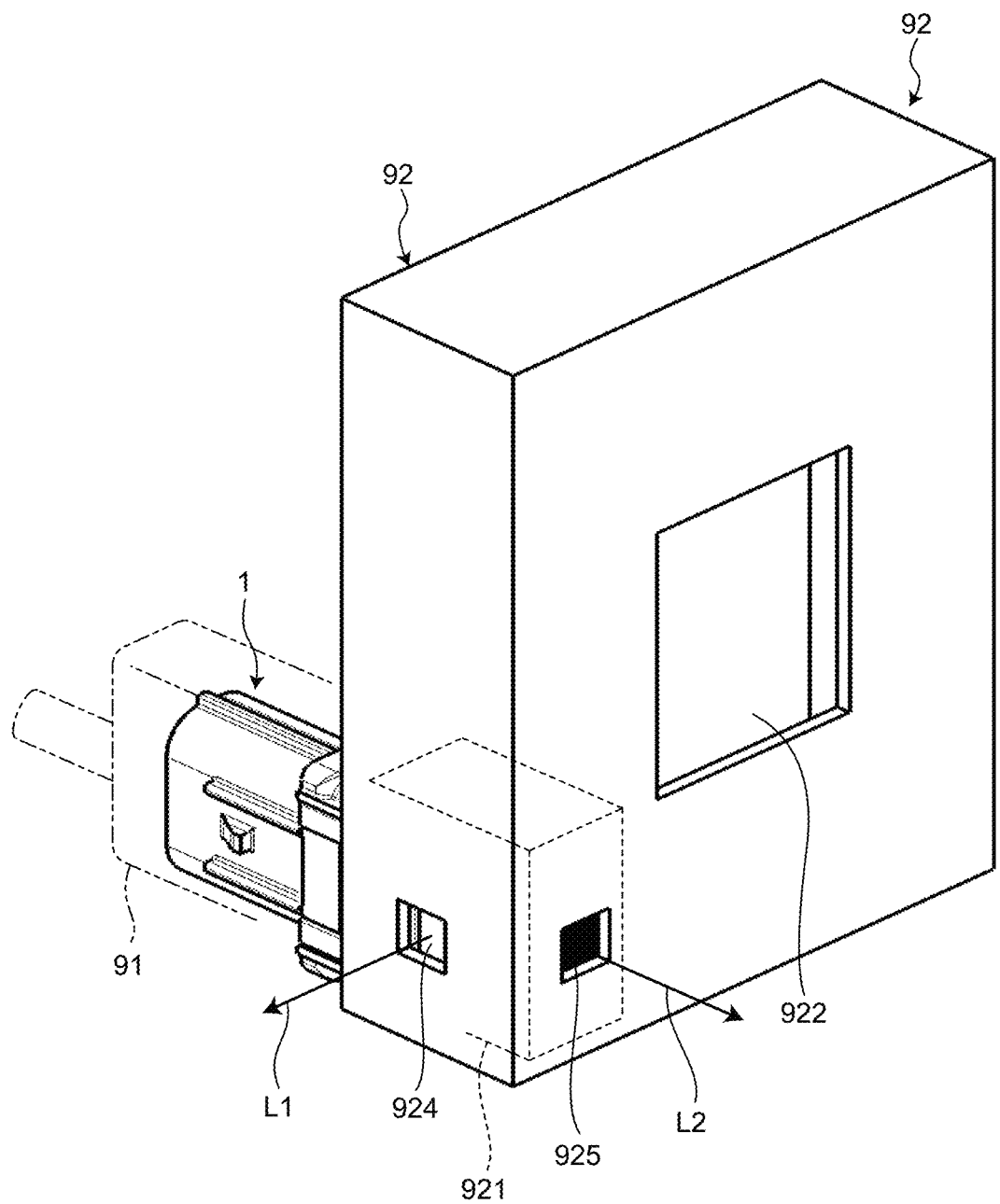
FIG. 12 is an explanatory view of installation of the illumination unit according to the first embodiment to the vehicle.

As illustrated in FIG. 12, a first output window 924 and a second output window 925 are formed at the receiving compartment 921. The first output window 924 and the second output window 925 are holes passing through the vehicle body 92 and establish communication between the inside of the receiving compartment 921 and the outside of the vehicle body 92. The first output window 924 is a part for outputting light L1 emitted by the first light-emitting element 51, and the second output window 925 is a part for outputting light L2 emitted by the second light-emitting element 52. For example, the light L1 is used as illumination light for illuminating the charging port 922, and the light L2 is used as an indicator for indicating charging information such as a state of charge and an amount of charge.

Next, the method of manufacturing the illumination unit 1 according to the present embodiment will be described.

In FIG. 1, the method of manufacturing the illumination unit 1 includes assembling the bus bar 4 to the housing 2. The bus bar 4 is assembled by inserting the bus bar 4 into the bus bar receiving slot 24. For example, as illustrated in FIG. 5, a plurality of the bus bars 4 are sequentially inserted into the bus bar receiving slots 24.

As illustrated in FIG. 7, when the bus bar 4 is inserted into the bus bar receiving slot 24, the main body 40 comes into contact with an inner wall 242 of the bus bar receiving slot 24. At this time, the lance 431 of the locking piece 43 enters the recess 241, and the bus bar 4 is locked so as not to slip out of the bus bar receiving slot 24. The connection portion 44 passes through the bus bar receiving slot 24 and protrudes into the internal space of the rear end hood 22. Since a part of the bus bar receiving slot 24 is formed to have the same dimension as the bus bar 4 in the height direction Z and the width direction Y, the bus bar 4 can be firmly held so that the bus bar 4 does not easily move.

Then, in FIG. 7, the substrate 5 is assembled to the housing 2. At this time, the substrate 5 is assembled to the housing 2 in a state in which electronic components including the first light-emitting element 51 and the second light-emitting element 52 are mounted. Further, the substrate 5 is assembled to the housing 2 in a state in which the light-blocking cover 6 is attached, for example. At this time, the substrate 5 and the light-blocking cover 6 conforming to the illumination performance of the vehicle on which the illumination unit 1 is installed is used. The substrate 5 is inserted between the supports 211A of the guides 211 of the front end hood 21 and is inserted far into the housing 2. Then, the substrate 5 is inserted between the first contact piece 41 and the second contact piece 42 of the bus bar 4 and is electrically connected to the bus bar 4. The bus bar 4 and the substrate 5 are stably connected by being firmly held by the housing 2. Therefore, in the illumination unit 1, the bus bar 4 can be appropriately connected to the substrate 5 without soldering. That is, in the illumination unit 1, the substrate 5 can be inserted into and electrically connected to the bus bar 4 held by the housing 2, and the bus bar 4 and the substrate 5 can be easily assembled. The illumination unit 1 as described above can be used for various vehicles while easily conforming thereto, by replacing the substrate 5 in accordance with the illumination performance required for the vehicle.

In FIG. 3, the packing 7 is attached to the front end hood 21 in a state in which the bus bar 4 and the substrate 5 are held with respect to the housing 2. The packing 7 is fitted to the outer periphery of the front end hood 21. Then, the case 3 is attached to the housing 2. The case 3 is attached to the end 2A of the housing 2 so as to cover the substrate 5. At this time, the light-blocking cover 6 is attached to the front end position of the substrate 5 and provided further on the front end side than the first light-emitting element 51 and the second light-emitting element 52. The light-blocking cover 6 surrounds the first light-emitting element 51 and the second light-emitting element 52. The light-blocking cover 6 is formed higher from the front face 5A of the substrate 5 than the first light-emitting element 51, and formed higher from the back face 5B of the substrate 5 than the second light-emitting element 52. Therefore, accidental contact of the case 3 with the first light-emitting element 51 and the second light-emitting element 52 can be avoided.

Figure 13:
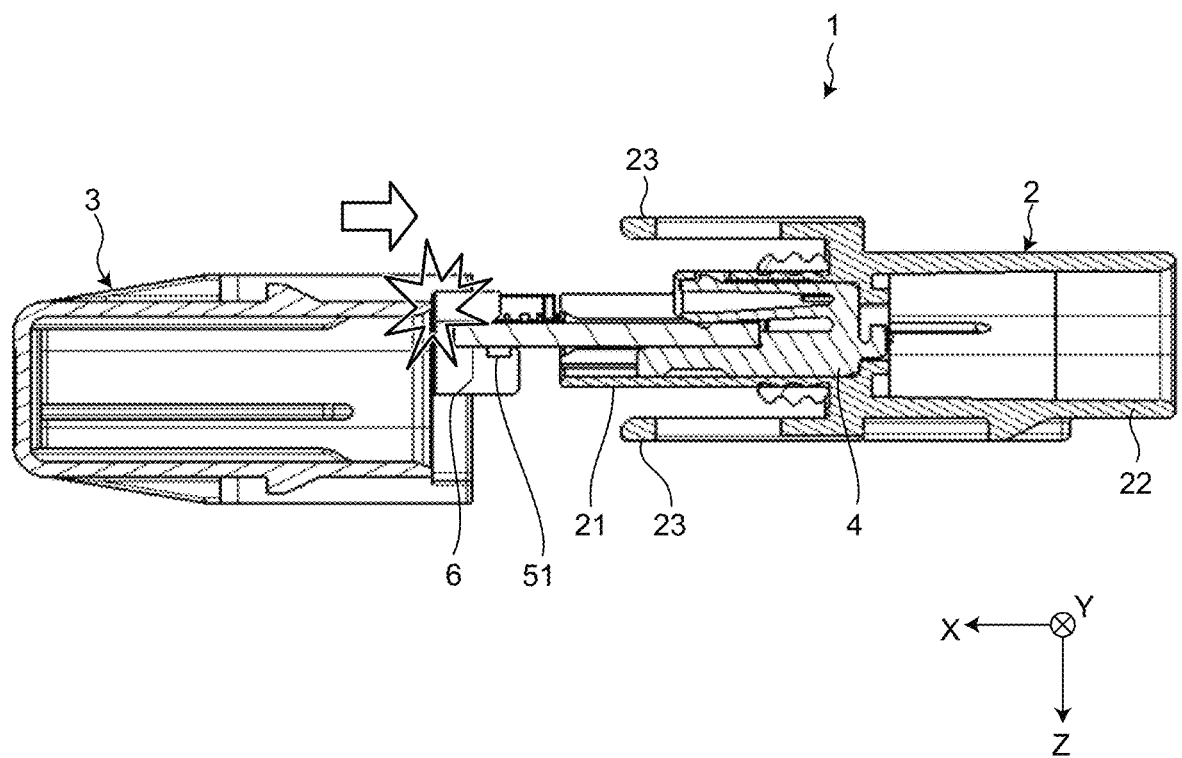
FIG. 13 is an explanatory view of a method of manufacturing the illumination unit according to the first embodiment.

For example, if the light-blocking cover 6 is not provided, the case 3 may come into contact with the first light-emitting element 51 or the second light-emitting element 52 upon attachment of the case 3. On the other hand, in the illumination unit 1, the light-blocking cover 6 surrounds the first light-emitting element 51 and the second light-emitting element 52. Thus, as illustrated in FIG. 13, even when the case 3 approaches the housing 2 at an improper position, the case 3 comes into contact with the light-blocking cover 6, and the first light-emitting element 51 and the second light-emitting element 52 are protected. Therefore, the illumination unit 1 can be properly manufactured.

Then, as illustrated in FIGS. 9 and 10, when the case 3 is brought close to the housing 2 at a proper position, the locking arm 23 of the housing 2 is locked to the locking claw 31 of the case 3, and the case 3 and the housing 2 are fitted and attached to each other. As described above, attachment of the case 3 to the housing 2 does not need screwing or bolting and can be quickly performed. When the attachment of the case 3 to the housing 2 is finished, the manufacturing of the illumination unit 1 is completed.

Next, the method of installing and using the illumination unit 1 according to the present embodiment will be described.

In FIG. 11, the illumination unit 1 is used by being installed in the vehicle body 92 of a vehicle. For example, the illumination unit 1 is installed by being inserted into the receiving compartment 921 provided in the vehicle body 92. That is, the illumination unit 1 is inserted into the receiving compartment 921 with the case 3 being at the head. Then, the locking portion 33 formed at the case 3 is locked to the locked portion 923 of the receiving compartment 921. As a result, the illumination unit 1 does not slip out of the receiving compartment 921.

Figure 14:
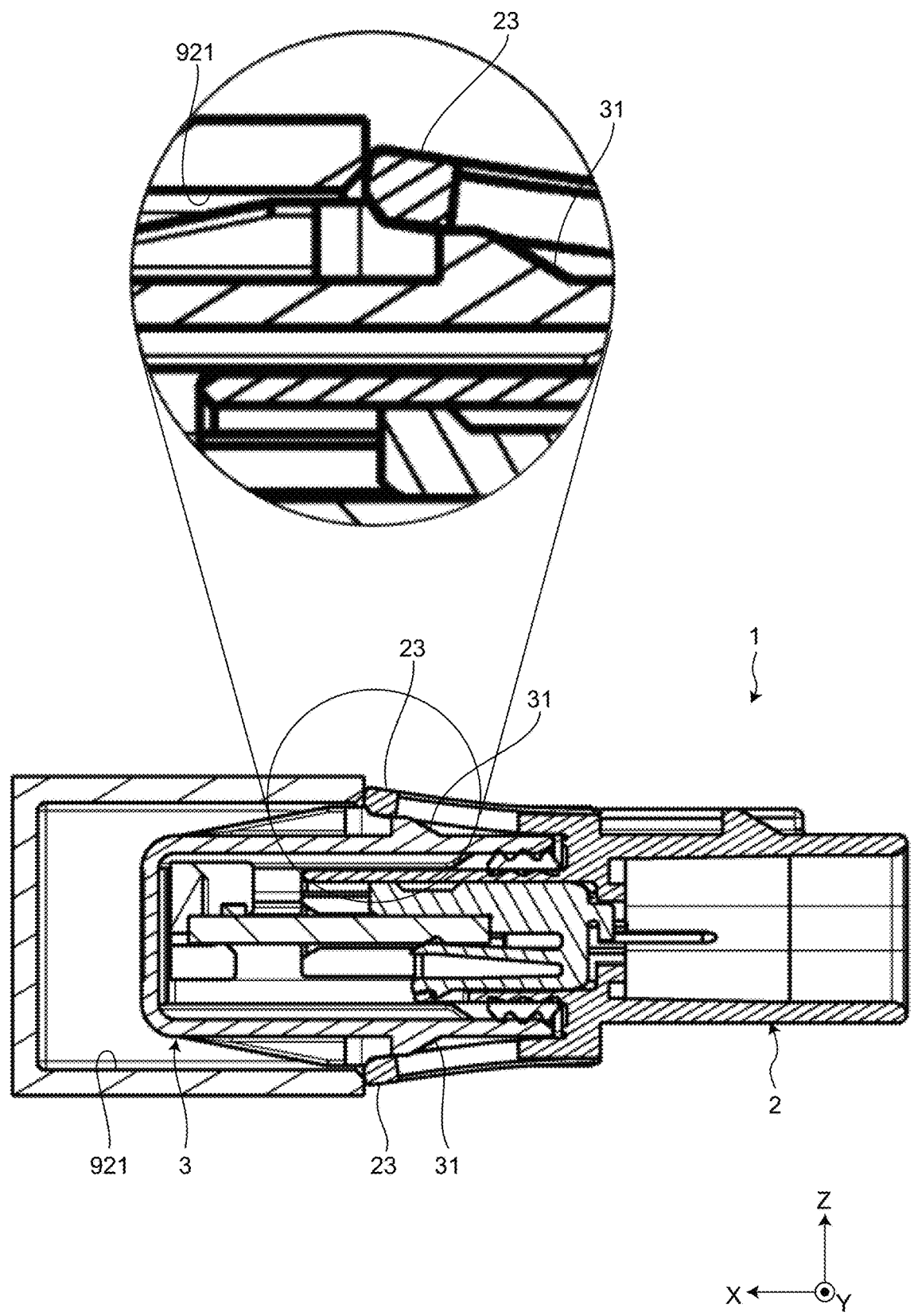
FIG. 14 is an explanatory view of a method of installing the illumination unit according to the first embodiment.

On the other hand, if the case 3 and the housing 2 of the illumination unit 1 are in the half-fitted state, the illumination unit 1 cannot be inserted into the receiving compartment 921. As illustrated in FIG. 14, when the case 3 and the housing 2 are in the half-fitted state, the locking arm 23 of the housing 2 runs on the locking claw 31 of the case 3 and protrudes in the height direction Z. Therefore, the locking arm 23 is caught by the entrance of the receiving compartment 921, and the illumination unit 1 cannot be inserted into the receiving compartment 921. That is, the illumination unit 1 can be installed in the receiving compartment 921 when the locking claw 31 and the locking arm 23 are properly engaged with each other, whereas the illumination unit 1 cannot be installed in the receiving compartment 921 when the locking claw 31 and the locking arm 23 are not properly engaged with each other. Therefore, the illumination unit 1 can avoid being installed in the vehicle body 92 in an improper state in which the case 3 and the housing 2 are in the half-fitted state. In this case, the illumination unit 1 is drawn out from the receiving compartment 921, and the case 3 and the housing 2 are brought into a properly fitted state.

Thereafter, the illumination unit 1 is inserted into and received in the receiving compartment 921.

Then, as illustrated in FIG. 12, the connector 91 is connected to the illumination unit 1, and the installation of the illumination unit 1 is completed. Note that the connector 91 may be connected before the illumination unit 1 is inserted into the receiving compartment 921.

The illumination unit 1 causes the first light-emitting element 51 and the second light-emitting element 52 to appropriately emit light by power supply and control signal input from the connector 91. In this way, the illumination unit 1 can illuminate a portion of a vehicle, such as the charging port 922, with the light L1 and display the light L2 serving as the charging information.

Figure 15:
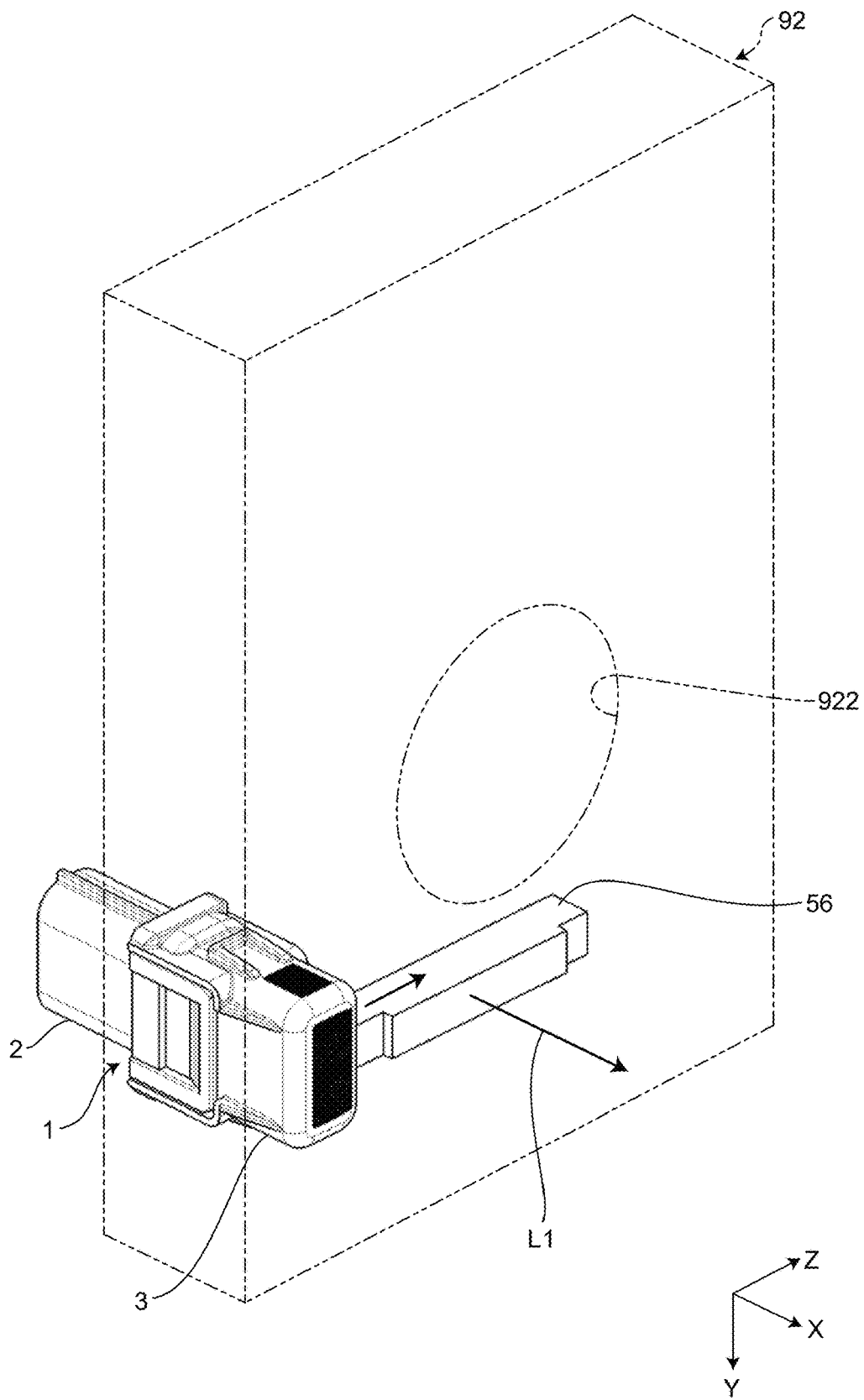
FIG. 15 is an explanatory view of a modification of the illumination unit according to the first embodiment.
Figure 16:
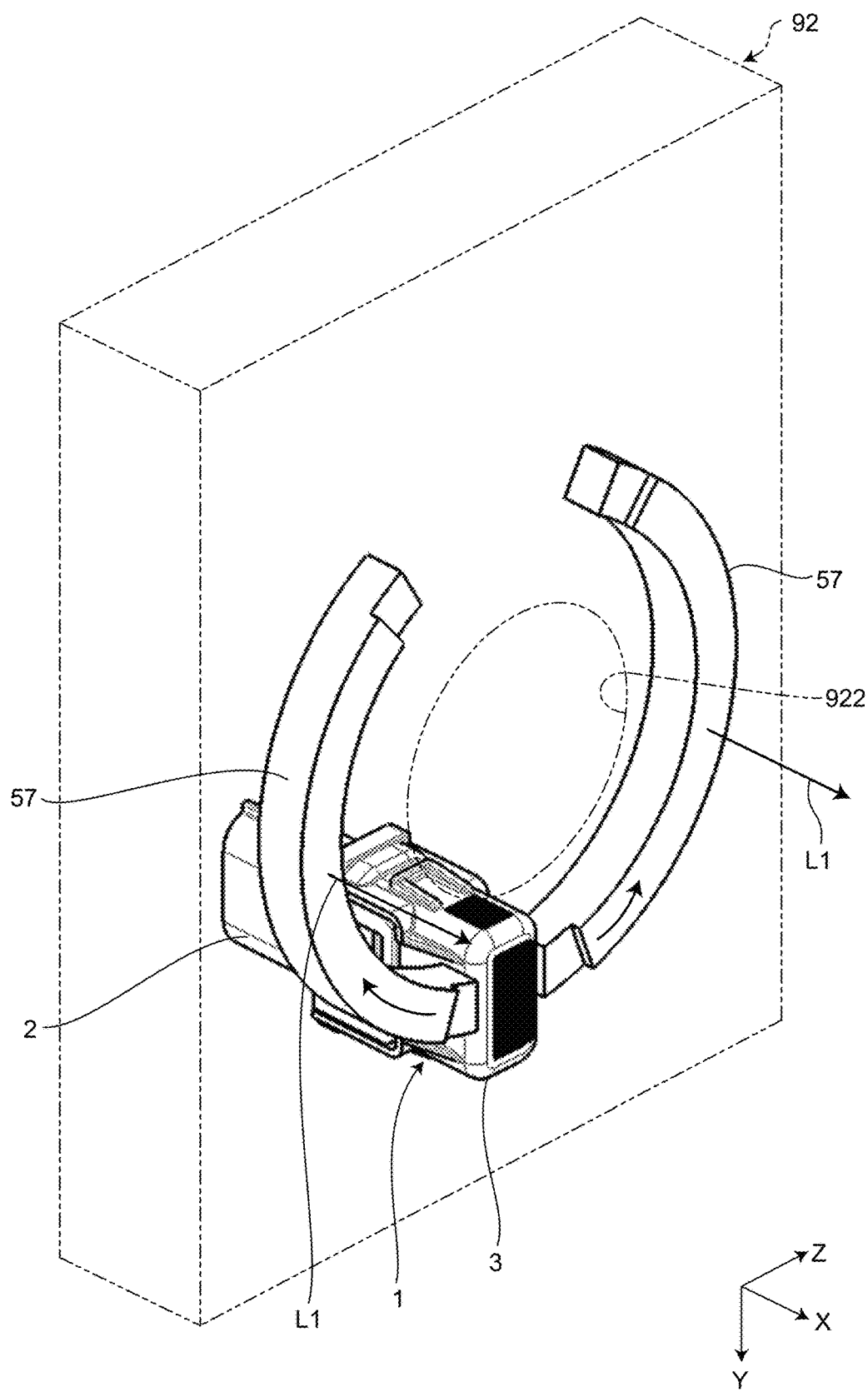
FIG. 16 is an explanatory view of the modification of the illumination unit according to the first embodiment.

As illustrated in FIGS. 15 and 16, the illumination unit 1 may illuminate a portion of the vehicle body with light by using light guide units 56 and 57. For example, as illustrated in FIG. 15, the light guide unit 56 is disposed adjacent to the case 3 of the illumination unit 1. The light guide unit 56 is a rod-shaped member that reflects light incident from the end on the inner face and outputs the band-shaped light L1 to the outside. For example, the light guide unit 56 is a linear rod. In this case, for example, the light-blocking cover 6 may be formed and installed so that light emitted from the first light-emitting element 51 provided at the substrate 5 is incident on the light guide unit 56. The light emitted from the first light-emitting element 51 is output from the case 3 and is incident on the light guide unit 56. As a result, the band-shaped light L1 is output from the light guide unit 56 and is used as illumination light.

For example, as illustrated in FIG. 16, two of the light guide units 57 are disposed adjacent to the case 3 of the illumination unit 1. The light guide unit 57 is a curved rod-shaped member that reflects light incident from the end on the inner face and outputs the arc-shaped light L1 to the outside. In this case, for example, the first light-emitting element 51 is provided on the front face 5A of the substrate 5, and the second light-emitting element 52 is provided on the back face 5B of the substrate 5. The substrate 5 and the light-blocking cover 6 are provided so that light can be incident on the light guide units 57 adjacent on the left side and right side of the case 3. With this configuration, each of the light emitted from the first light-emitting element 51 and the second light-emitting element 52 is output from the case 3 and is incident on a corresponding one of the light guide unit 57. As a result, the curved band-shaped light L1 is output from the light guide unit 57 and is used as illumination light. As described above, the illumination unit 1 according to the present embodiment includes the light-blocking cover 6 provided so as to block light emitted from the first light-emitting element 51 and the second light-emitting element 52 and surround the first light-emitting element 51 and the second light-emitting element 52. With this configuration, the light emitted from the first light-emitting element 51 and the second light-emitting element 52 can be appropriately output, and the first light-emitting element 51 and the second light-emitting element 52 can be protected by the light-blocking cover 6 upon attachment of the case 3. Therefore, the illumination unit 1 according to the present embodiment can be appropriately manufactured.

In the illumination unit 1 according to the present embodiment, the case 3 is made of a light-transmissive material, and the light-blocking cover 6 that does not cover the first light-emitting element 51 and the second light-emitting element 52 in the direction in which light is output from the case 3 is provided. With this configuration, light can be output from the case 3 in a desired direction. Therefore, the illumination unit 1 according to the present embodiment can be installed in various vehicles while conforming to illumination functions required for various vehicles without changing the design of the case 3.

Since the illumination unit 1 according to the present embodiment includes the light-blocking cover 6 having a white surface, light emitted from the first light-emitting element 51 and the second light-emitting element 52 can be reflected by the light-blocking cover 6. Therefore, the amount of light output from the case 3 can be increased.

The illumination unit 1 according to the present embodiment can be used by replacing the substrate 5 in accordance with the illumination performance required for the vehicle and can be used for various vehicles while easily conforming thereto. In the illumination unit 1 according to the present embodiment, the bus bar 4 and the substrate 5 can be connected by sandwiching the substrate 5 with the bus bar 4, the illumination unit 1 can be easily manufactured.

In the illumination unit 1 according to the present embodiment, the bus bar 4 can be installed by inserting the bus bar 4 into the bus bar receiving slot 24 of the housing 2, and the substrate 5 can be electrically connected by sandwiching the substrate 5 with the bus bar 4. Therefore, in the illumination unit 1 according to the present embodiment, the bus bar 4 and the substrate 5 can easily be assembled.

In the illumination unit 1 according to the present embodiment, the case 3 is made of a light-transmissive material, and the light-blocking cover 6 that covers the first light-emitting element 51 is provided. With this configuration, light can be output from the case 3 in a desired direction. Therefore, the illumination unit 1 according to the present embodiment can be installed in various vehicles while conforming to illumination functions required for different vehicles without changing the design of the case 3.

The illumination unit 1 according to the present embodiment is received in the receiving compartment 921 formed at the vehicle body 92 of a vehicle, and is installed by locking the locking portion 33 to the locked portion 923 of the receiving compartment 921. Therefore, the illumination unit 1 according to the present embodiment can be easily assembled to various vehicles and can be easily used as an illumination device.

By providing the locking claw 31 and the locking arm 23 that can be engaged with each other, the illumination unit 1 according to the present embodiment can restrain the illumination unit 1 itself from being received in the receiving compartment 921 in a state in which the housing 2 and the case 3 are not properly fitted to each other.

Second Embodiment

Next, the illumination unit according to the second embodiment will be described.

Figure 17:
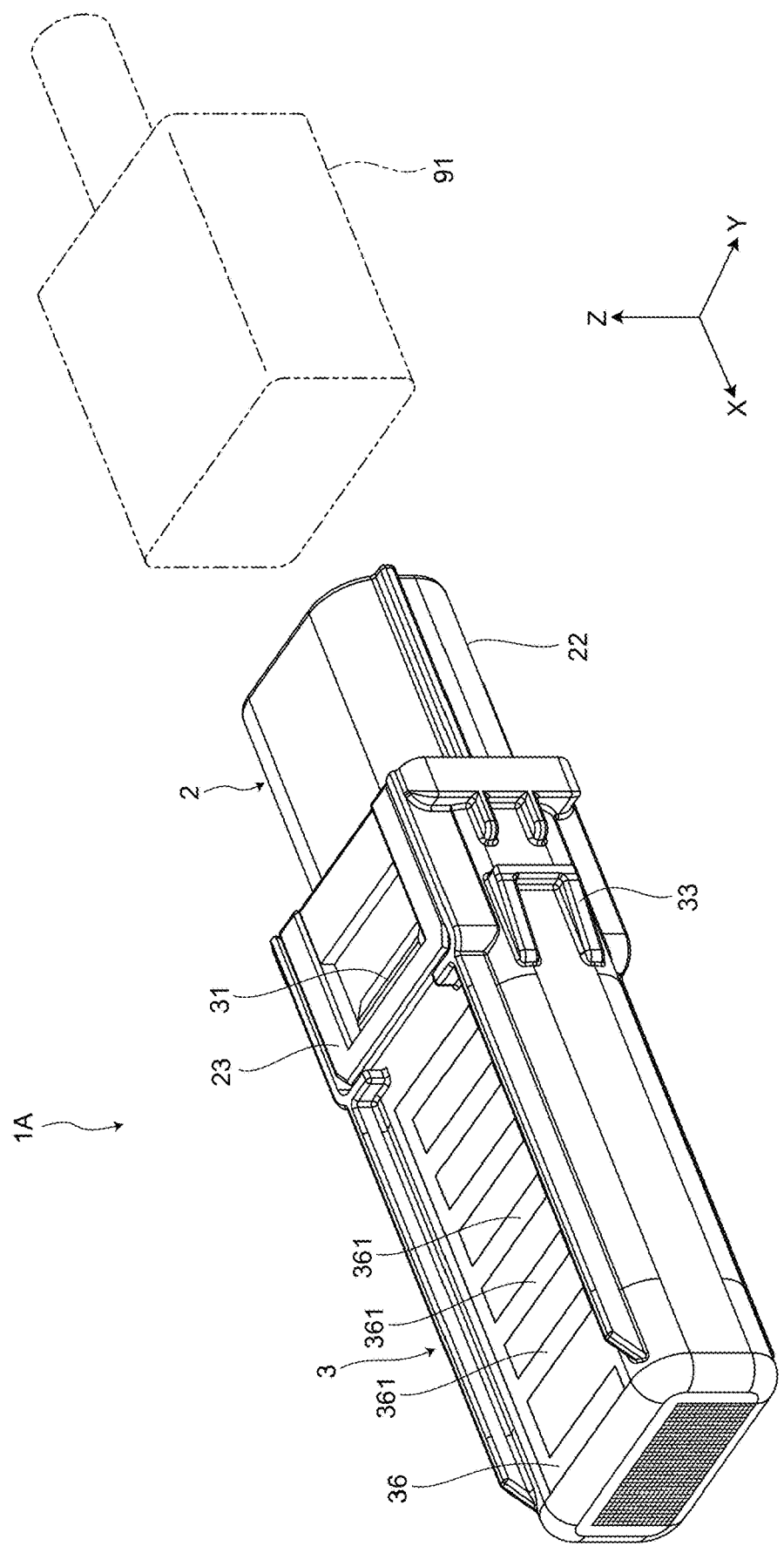
FIG. 17 is a perspective view of an illumination unit according to a second embodiment.
Figure 18:
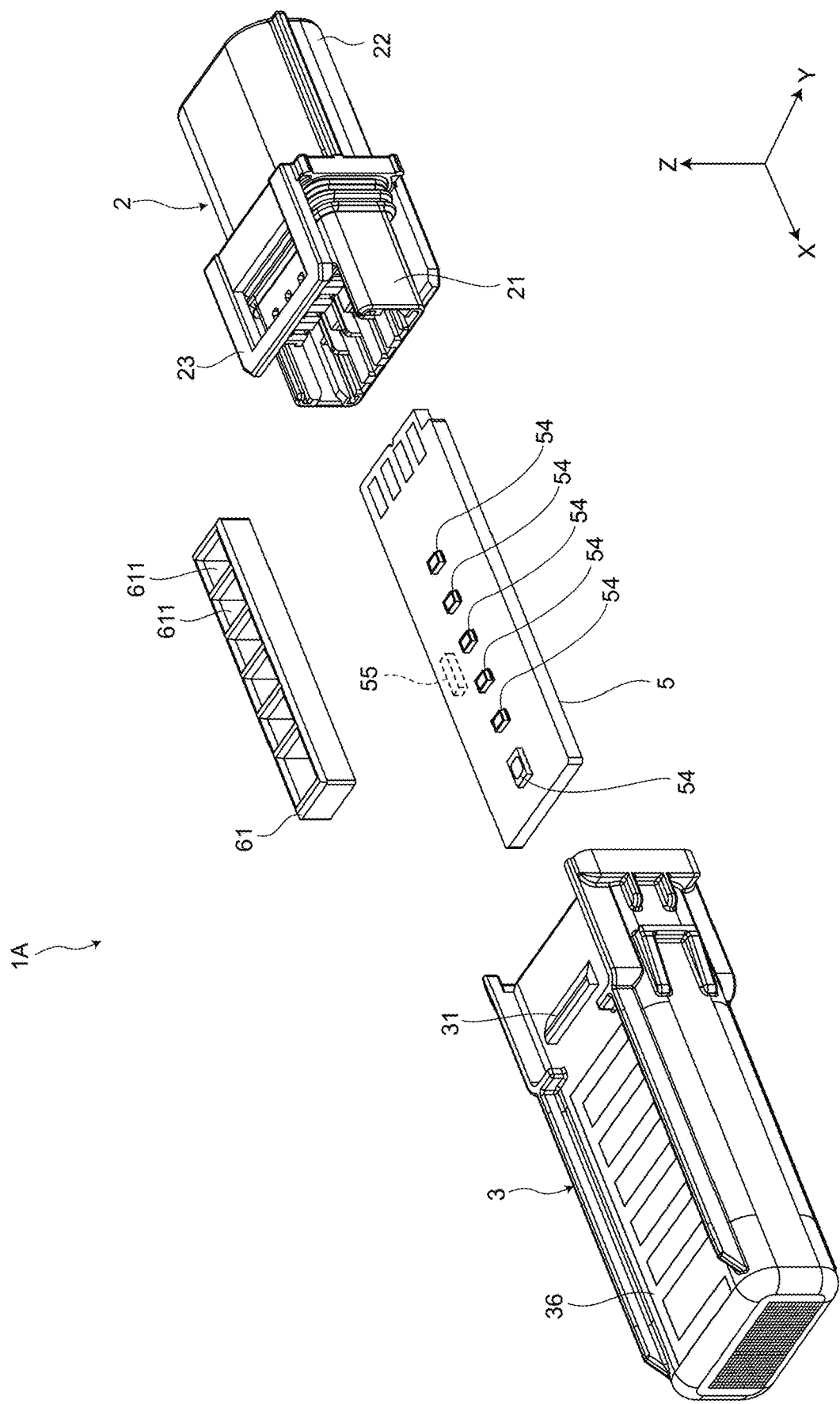
FIG. 18 is an exploded perspective view of the illumination unit according to the second embodiment.

As illustrated in FIGS. 17 and 18, an illumination unit 1A according to the second embodiment includes a greater number of the light-emitting elements than the illumination unit 1 according to the first embodiment described above. The illumination unit 1A has substantially the same structure as the illumination unit 1, and a housing 2 and a bus bar 4 that are the same as those of the illumination unit 1 according to the first embodiment can be used.

A case 3 of the illumination unit 1A is formed longer in the connection direction X than that of the illumination unit 1, and a large number of light-emitting elements 54 are arranged on a substrate 5 of the illumination unit 1A in the connection direction X. That is, the substrate 5 includes a plurality of the light-emitting elements 54 for indicator on the mounting face on the front side and includes a light-emitting element 55 for illumination on the mounting face on the back side. The light-emitting element 55 for illumination is disposed at a position at or near the center of the array range of the plurality of light-emitting elements 54 for indicator in the connection direction X.

A light-blocking cover 61 is attached to the substrate 5. The light-blocking cover 61 is a member that blocks a part of light emitted from the light-emitting elements 54 and regulates or adjusts an output direction of light. The light-blocking cover 61 functions as a protective member that protects the light-emitting elements 54 upon attachment of the case 3 to the housing 2. The light-blocking cover 61 is formed so as to surround the periphery of each of the light-emitting elements 54. For example, the light-blocking cover 61 is a block extending in the connection direction X and forms an accommodating portion 611 that individually accommodates the light-emitting elements 54. The accommodating portion 611 passes through the light-blocking cover 61 in the height direction Z and outputs light emitted from the light-emitting element 54 in the height direction Z while accommodating the light-emitting element 54. The light-blocking cover 61 is formed higher in the height direction Z than the light-emitting element 54 and protects the light-emitting element 54 so that the case 3 does not come into contact with the light-emitting element 54 upon attachment of the case 3 to the housing 2.

For example, a white cover is used as the light-blocking cover 61. By making a light-blocking cover 61 white, the light reflectance of the light-blocking cover 61 can be increased. Therefore, as compared with the light-blocking cover 61 being not white, such as the black light-blocking cover 61, the amount of light emitted from the illumination unit 1A can be increased.

A light-blocking portion 36 is provided at the case 3 of the illumination unit 1A. Most of the case 3 is made of a light-transmissive member, but the light-blocking portion 36 that only a part of the case 3 is made of a light-blocking member is provided. The light-blocking portion 36 is formed of, for example, a resin having a color such as black. The light-blocking portion 36 forms a plurality of partitions 361 each extending in the width direction Y at a position between the light-emitting element 54 and the light-emitting element 54. The partition 361 is a part that restrains light leakage of the adjacent light-emitting elements 54. The partition 361 partitions the light emitted from the light-emitting elements 54 so as not to leak out to the light output position of the adjacent light-emitting elements 54. The light-blocking portion 36 is formed by, for example, resin-molding the case 3 by two-color molding using a light-transmissive resin and a light-blocking resin.

Figure 19:
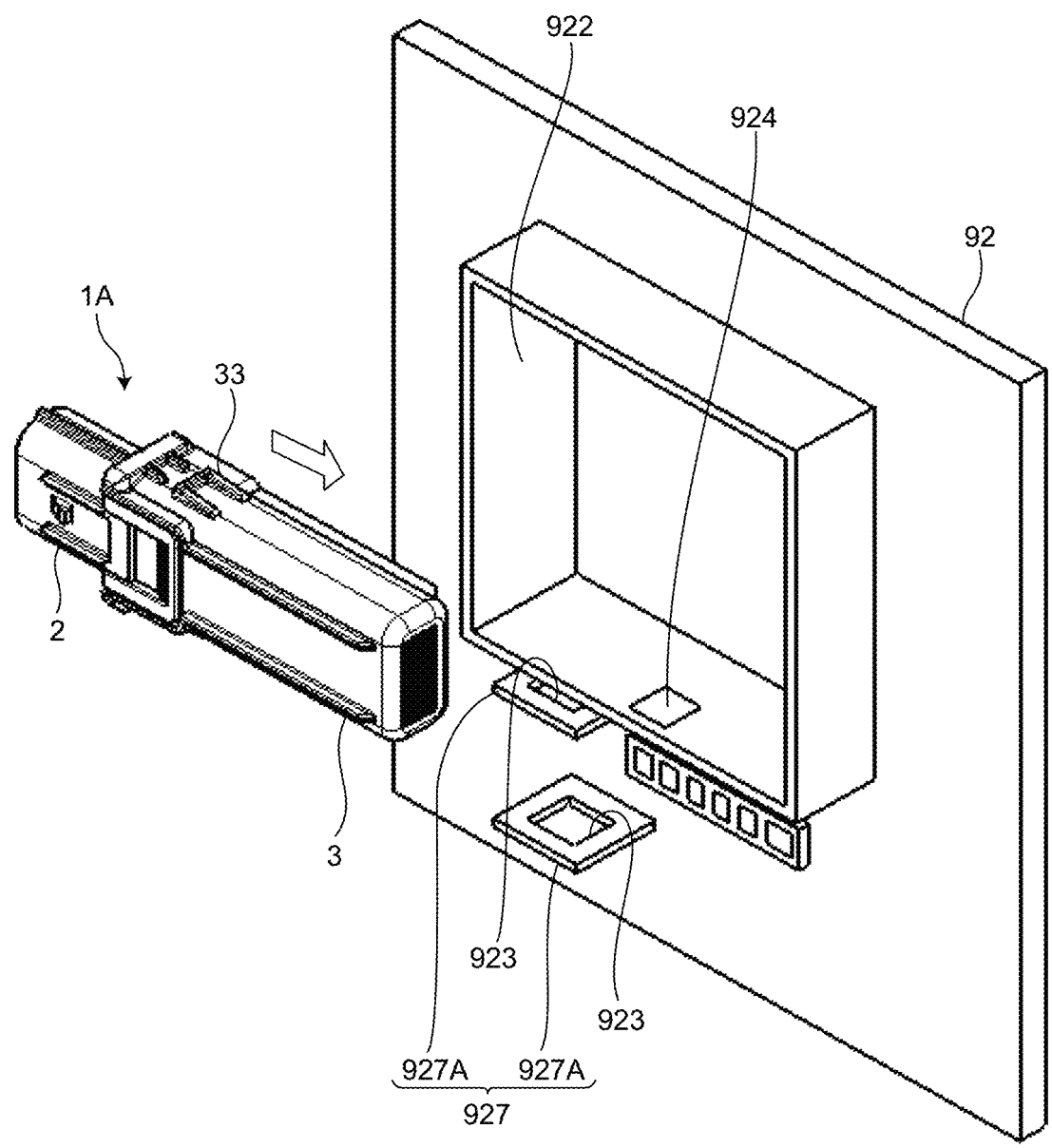
FIG. 19 is an explanatory view of installation of the illumination unit according to the second embodiment to a vehicle.
Figure 20:
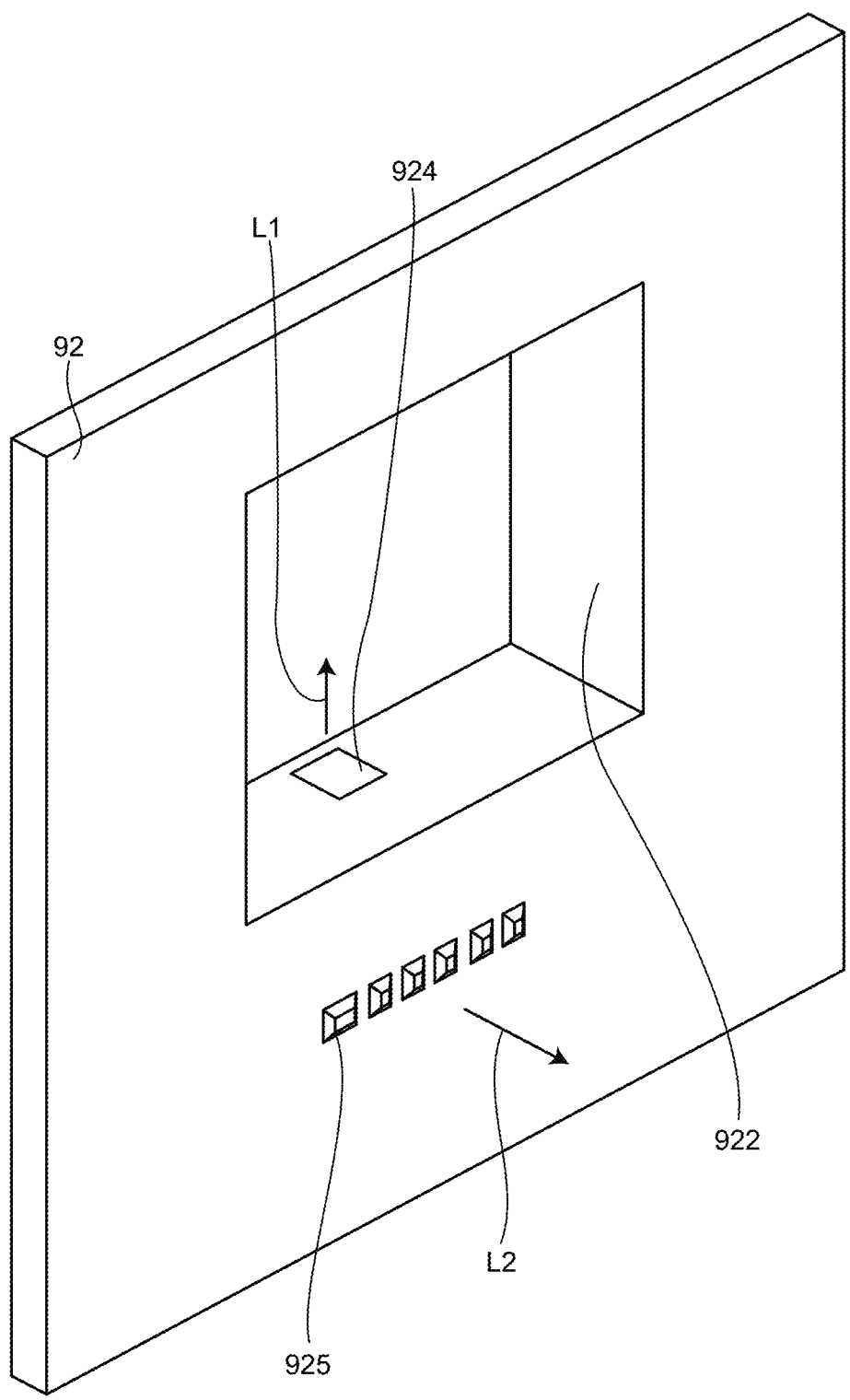
FIG. 20 is an explanatory view of installation of the illumination unit according to the second embodiment to the vehicle.

As illustrated in FIG. 19, the illumination unit 1A is used by being installed in a vehicle body 92. The vehicle body 92 is, for example, a part forming a charging port 922 of a vehicle and is assembled to the vehicle. The vehicle body 92 includes an installation portion 927 in which the illumination unit 1A can be installed. The installation portion 927 is provided, for example, on the back side of the vehicle body 92 and includes two holders 927A that hold the illumination unit 1A by sandwiching the illumination unit 1A. A locked portion 923 is formed at the holder 927A. The locked portion 923 is a part to be engaged with the locking portion 33 of the illumination unit 1A and is formed as, for example, a hole or a recess formed by recessing an inner face 921A. The illumination unit 1A is inserted between the holders 927A and installed in the vehicle body 92. A connector 91 is connected to the housing 2 of the illumination unit 1A (see FIG. 12). As illustrated in FIG. 20, the operation of the illumination unit 1A causes light L1 emitted from the light-emitting element 55 from a first output window 924 to be output as the illumination light, and causes light L2 emitted from the light-emitting element 54 from the second output window 925 to be output as light of the indicator. The light L2 is used as an indicator that indicates charging information such as the state of charge and the amount of charge of a vehicle. Since the illumination unit 1A includes the plurality of light-emitting elements 54, the number of light emission of the light L2 can be increased in accordance with a state of charge. Therefore, in the illumination unit 1A, a state of charge can be easily recognized.

As described above, the illumination unit 1A according to the present embodiment includes the light-blocking cover 61 that individually partitions the plurality of light-emitting elements 54 provided on the same surface of the substrate 5 and blocks light. With this configuration, light emitted from the light-emitting elements 54 can be restrained from being mixed with and interfering with light emitted from the other light-emitting elements 54.

Therefore, the illumination unit 1A according to the present embodiment can appropriately output light emitted from the light-emitting element 54 from the case 3.

The illumination unit 1A according to the present embodiment can be used by replacing the substrate 5 in accordance with the illumination performance required for the vehicle and can be used for various vehicles while easily conforming thereto. In the illumination unit 1A according to the present embodiment, the bus bar 4 and the substrate 5 can be connected by sandwiching the substrate 5 with the bus bar 4, the illumination unit 1A can be easily manufactured.

Although embodiments have been illustrated as described above, the illumination unit according to the present invention is not limited to the above-described embodiments, and various modifications can be made within the scope recited in the claims. The illumination unit according to the present embodiments may be configured by appropriately combining the constituent elements of the embodiments and the modifications described above.

For example, in the illumination unit 1 and the illumination unit 1A according to the above-described embodiments, the case in which the surfaces of the light-blocking covers 6 and 61 are white has been described, but the surfaces of the light-blocking covers 6 and 61 may have a color other than white. Even in such an illumination unit, similarly to the illumination unit 1 and the illumination unit 1A according to the above-described embodiments, light can be appropriately output by including the light-blocking covers 6 and 61 surrounding the light-emitting element, and the light-emitting elements can be protected upon attachment of the case 3. Thus, such an illumination unit can also be appropriately manufactured.

In the illumination unit 1 and the illumination unit 1A according to the above-described embodiments, the case in which the locking arm 23 is provided at the housing 2 and the locking claw 31 is provided at the case 3 has been described, but the locking claw may be provided at the housing 2 and the locking arm may be provided at the case 3. Similarly to the illumination units 1 and 1A described above, such an illumination unit can also be used by replacing the substrate 5 in accordance with the illumination performance required for the vehicle and can be used for various vehicles while easily conforming thereto.

The illumination unit according to the present embodiment can appropriately output light and can be appropriately manufactured.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An illumination unit comprising:
   a substrate to which a light-emitting element is mounted;
   a housing that holds the substrate;
   a case that is attached to the housing to cover the substrate, and allows light of the light-emitting element to be output to an outside; and
   a light-blocking cover that is attached to the substrate, surrounds the light-emitting element and leaves the light-emitting element in a direction in which the light is output uncovered, and is formed higher from an attachment face of the substrate than the light-emitting element.

2. The illumination unit according to claim 1, wherein the case is formed of a light-transmissive material, and the light-blocking cover leaves the light-emitting element uncovered in a direction in which the light is output from the case, and covers the light-emitting element in a direction in which none of the light is output from the case.

3. The illumination unit according to claim 1, wherein the light-blocking cover has a white surface.

4. The illumination unit according to claim 2, wherein the light-blocking cover has a white surface.

5. The illumination unit according to claim 1, wherein a plurality of the light-emitting elements are provided on the same surface of the substrate, and the light-blocking cover individually partitions the plurality of light-emitting elements and blocks the light.

6. The illumination unit according to claim 2, wherein a plurality of the light-emitting elements are provided on the same surface of the substrate, and the light-blocking cover individually partitions the plurality of light-emitting elements and blocks the light.

* * * * *